US012121807B2

(12) United States Patent
Zhao et al.

(10) Patent No.: US 12,121,807 B2
(45) Date of Patent: Oct. 22, 2024

(54) IMAGE PROCESSING METHOD USING A SHARED GPU SHADER CACHE MECHANISM AND APPARATUS, SERVER, AND MEDIUM

(71) Applicant: Tencent Technology (Shenzhen) Company Limited, Shenzhen (CN)

(72) Inventors: Xinda Zhao, Shenzhen (CN); Zhipeng Gong, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 275 days.

(21) Appl. No.: 17/731,170

(22) Filed: Apr. 27, 2022

(65) Prior Publication Data
US 2022/0249948 A1    Aug. 11, 2022

Related U.S. Application Data

(63) Continuation of application No. PCT/CN2021/100026, filed on Jun. 15, 2021.

(30) Foreign Application Priority Data

Jul. 21, 2020 (CN) .......................... 202010704005.8

(51) Int. Cl.
*A63F 13/52* (2014.01)
*G06F 8/41* (2018.01)
(Continued)

(52) U.S. Cl.
CPC ................ *A63F 13/52* (2014.09); *G06F 8/41* (2013.01); *G06T 1/20* (2013.01); *G06T 1/60* (2013.01)

(58) Field of Classification Search
CPC ... A63F 13/52; G06F 8/41; G06T 1/20; G06T 1/60
See application file for complete search history.

(56) References Cited

U.S. PATENT DOCUMENTS

| 2015/0045118 A1 | 2/2015 | Bishop et al. |
| 2016/0162272 A1 | 6/2016 | Zhang et al. |

(Continued)

FOREIGN PATENT DOCUMENTS

| CN | 106933635 A | 7/2017 |
| CN | 110933036 A | 3/2020 |

(Continued)

OTHER PUBLICATIONS

Tencent Technology, Japanese Office Action, JP Application No. 2022548779, Oct. 23, 2023, 6 pgs.

(Continued)

*Primary Examiner* — Omkar A Deodhar
*Assistant Examiner* — Shauna-Kay Hall
(74) *Attorney, Agent, or Firm* — Morgan, Lewis & Bockius LLP

(57) ABSTRACT

This application discloses an image processing method, a server, and a computer-readable storage medium. The method includes: obtaining, in response to a trigger for an operation event of a target game running in a target container, a target shader code corresponding to the operation event; obtaining a target compilation result of the target shader code from a game resource, the game resource including: a game image of the target game and/or a target shared directory between the target container and an associated container of the target container. The target shared directory includes a first compilation result of compiling, when running the target game, at least one shader code by the associated container; and performing graphic processing (Continued)

according to the target compilation result to obtain a feedback image corresponding to the operation event.

20 Claims, 16 Drawing Sheets

(51) Int. Cl.
*G06T 1/20* (2006.01)
*G06T 1/60* (2006.01)

(56) References Cited

U.S. PATENT DOCUMENTS

| | | | |
|---|---|---|---|
| 2017/0354888 A1 | 12/2017 | Benedetto et al. | |
| 2017/0371678 A1* | 12/2017 | Wang | A63F 13/355 |
| 2019/0308099 A1 | 10/2019 | Lalonde et al. | |
| 2020/0058263 A1 | 2/2020 | McKeever et al. | |

FOREIGN PATENT DOCUMENTS

| | | |
|---|---|---|
| CN | 111352692 A | 6/2020 |
| CN | 111736850 A | 10/2020 |
| JP | 2008310835 A | 12/2008 |
| WO | WO 2007032879 A1 | 3/2007 |
| WO | WO 2019/074952 A2 | 4/2019 |
| WO | WO 2019147974 A2 | 8/2019 |
| WO | WO 2019/199848 A1 | 10/2019 |

OTHER PUBLICATIONS

Guo Tao, "Edge Computing Takes Hold", China Information Weekly, Issue 47, Jan. 6, 2019, 12 pgs.
Tencent Technology, ISR, PCT/CN2021/100026, Aug. 27, 2021, 2 pgs.
Tencent Technology, WO, PCT/CN2021/100026, Aug. 27, 2021, 5 pgs.
Tencent Technology, IPRP, PCT/CN2021/100026, Jan. 24, 2023, 6 pgs.
Google, LLC, International Search Report in PCT/US2018/055055, published under WO 2019074952 A3 on Apr. 18, 2019, 7 pgs.
Tencent Technology, Extended European Search Report and Supplementary Search Report, EP21845550.9, Jul. 18, 2023, 10 pgs.
Tencent Technology, Indian Office Action, IN Patent Application No. 202237038878, Aug. 1, 2023, 8 pgs.
Tencent Technology, Korean Office Action, KR Patent Application No. 10-2022-7017638, May 17, 2024, 35 pgs.

* cited by examiner

IMAGE PROCESSING METHOD USING A SHARED GPU SHADER CACHE MECHANISM AND APPARATUS, SERVER, AND MEDIUM

CROSS-REFERENCE TO RELATED APPLICATIONS

This application is a continuation application of PCT Patent Application No. PCT/CN2021/100026, entitled "IMAGE PROCESSING METHOD AND APPARATUS, AND SERVER AND MEDIUM" filed on Jun. 15, 2021, which claims priority to Chinese Patent Application No. 202010704005.8, filed with the State Intellectual Property Office of the People's Republic of China on Jul. 21, 2020, and entitled "IMAGE PROCESSING METHOD AND APPARATUS, SERVER, AND MEDIUM", all of which are incorporated herein by reference in their entirety.

FIELD OF THE TECHNOLOGY

This application relates to the field of Internet technologies, specifically, to the field of image processing technologies, and in particular, to an image processing method, an image processing apparatus, a server, and a computer storage medium.

BACKGROUND OF THE DISCLOSURE

With the development of Internet technologies, cloud gaming has attracted much attention. The cloud gaming may also be referred to as gaming on demand, and is a gaming mode based on cloud computing. The cloud computing is an Internet-based computing mode. Cloud gaming technology allows a client device with relatively limited graphic processing and data computing capabilities to run a high-quality game. In a cloud gaming scenario, a game is run on a cloud server instead of a game client of a player. The cloud server renders a game scene into video and audio streams, and transmits the video and audio streams to the game client of the player through a network for playback. The game client of the player does not need to have high graphic processing and data computing capabilities, and only needs to have a basic streaming playback capability and a capability of obtaining an input instruction of the player and sending the input instruction to the cloud server.

For a cloud game, a duration consumed during game running is an important indicator for measuring a running speed of the cloud game. When the duration consumed during game running is longer, the running speed of the cloud game is slower. When the duration consumed during game running is shorter, the running speed of the cloud game is faster. In view of this, how to shorten the duration consumed during game running to increase the running speed of the cloud game has become a research hotspot.

SUMMARY

Embodiments of this application provide an image processing method and apparatus, a server, and a medium, to effectively shorten a duration of compiling a target shader code, thereby effectively increasing the running speed of a target game.

According to an aspect, an embodiment of this application provides an image processing method, including:

obtaining, in response to a trigger for an operation event of a target game running in a target container, a target shader code corresponding to the operation event;

obtaining a target compilation result of the target shader code from a game resource, the game resource including: a game image of the target game and/or a target shared directory between the target container and an associated container of the target container, the target shared directory including a first compilation result of compiling, when running the target game, at least one shader code by the associated container; and performing graphic processing according to the target compilation result to obtain a feedback image corresponding to the operation event.

According to another aspect, an embodiment of this application provides an image processing apparatus, including:

an obtaining unit, configured to obtain, in response to an operation event for a target game run in a target container, a target shader code corresponding to the operation event, the obtaining unit being further configured to obtain a target compilation result of the target shader code from a game resource, the game resource including at least one of the following: a game image of the target game and a target shared directory between the target container and an associated container of the target container, the target shared directory including a first compilation result obtained by compiling at least one shader code by the associated container in a process of running the game; and a processing unit, configured to perform graphic processing according to the target compilation result, to obtain a feedback image corresponding to the operation event.

According to still another aspect, an embodiment of this application provides a server including an input interface and an output interface. The server further includes:

a computer storage medium, configured to store one or more instructions; and a processor, configured to load the one or more instructions stored in the computer storage medium, to perform the following steps:

obtaining, in response to an operation event for a target game run in a target container, a target shader code corresponding to the operation event;

obtaining a target compilation result of the target shader code from a game resource, the game resource including at least one of the following: a game image of the target game and a target shared directory between the target container and an associated container of the target container, the target shared directory including a first compilation result obtained by compiling at least one shader code by the associated container in a process of running the game; and performing graphic processing according to the target compilation result, to obtain a feedback image corresponding to the operation event.

According to yet another aspect, an embodiment of this application provides a computer storage medium, storing one or more instructions, the one or more instructions being configured to be loaded by a processor to perform the following steps:

obtaining, in response to a trigger for an operation event of a target game run in a target container, a target shader code corresponding to the operation event;

obtaining a target compilation result of the target shader code from a game resource, the game resource including: a game image of the target game and/or a target shared directory between the target container and an associated container of the target container, the target shared directory including a first compilation result of compiling, when running the target game, at least one shader code by the associated container; and performing graphic processing according to the target compilation result to obtain a feedback image corresponding to the operation event.

BRIEF DESCRIPTION OF THE DRAWINGS

To describe the technical solutions in the embodiments of this application more clearly, the following briefly introduces the accompanying drawings required for describing the embodiments. Apparently, the accompanying drawings in the following description show only some embodiments of this application, and a person of ordinary skill in the art may still derive other drawings from these accompanying drawings without creative efforts.

DESCRIPTION OF EMBODIMENTS

Figure 1A:
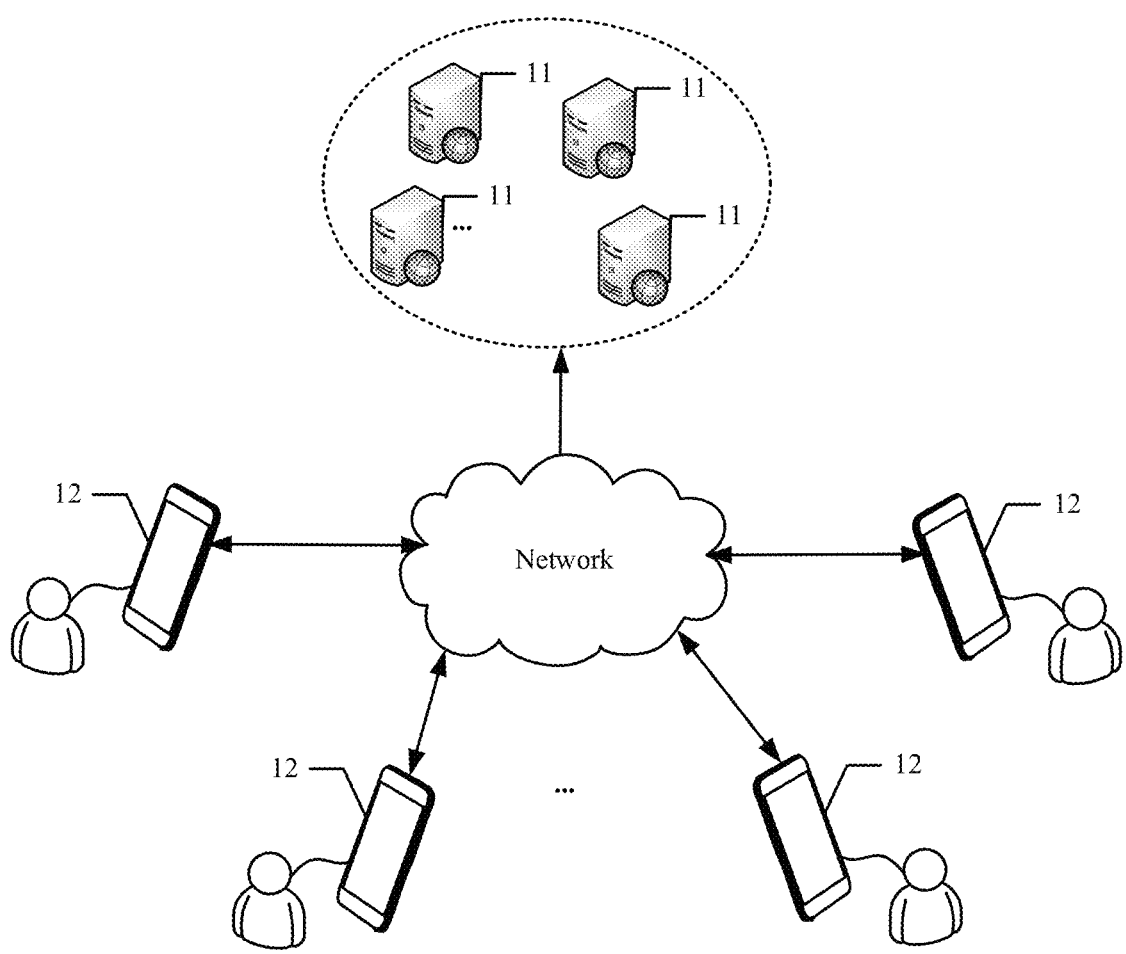
FIG. 1A is a diagram of a system architecture of a cloud gaming system according to an embodiment of this application.

Technical solutions in embodiments of this application are clearly and completely described below with reference to the accompanying drawings in the embodiments of this application.

To better run a cloud game, an embodiment of this application provides a cloud gaming environment. In the cloud gaming environment, a plurality of operating systems may be run on an independent server (for example, a server with an architecture such as an ARM architecture or an x86 architecture) by running a system container, and related images are transmitted to a remote receiving program through a video stream for processing. The ARM architecture is a processor architecture of a 32-bit or 64-bit reduced instruction set, and the x86 architecture is a computer language instruction set executed by a microprocessor. The container refers to a virtualized type on an operating system level and may be configured to carry an operating system. The container may be implemented by using an isolation mechanism (for example, a namespace). In a kernel mode, a plurality of operating systems (that is, a server operating system and a device operating system) share a same kernel; and in a user mode, the plurality of operating systems remain independent of each other. The server operating system refers to a general-purpose operating system, for example, a Linux operating system in the server. A host on which the server operating system resides may be referred to as a server host. The device operating system refers to an operating system, for example, an Android operating system, an IOS operating system, or the like in the container.

Correspondingly, the system container refers to an exemplary container and may be run based on the server operating system (for example, the Linux operating system). For example, the system container may be an Android container running on an open-source Linux operating system, and a plurality of Android containers may simultaneously run on one Linux operating system. An Android game image is loaded by the Android container. The Android game image refers to a mirror file including both basic Android-related files and game-related files. The mirror refers to a file storage form in which a plurality of files are combined into a single mirror file by using the mirror to facilitate distribution and use of the files. It is to be understood that the system container mentioned in this embodiment of this application is not limited to the Android container. For example, the system container may also be an IOS container when the IOS operating system supports open-source research and development. Based on the above, in the cloud gaming environment provided in this embodiment of this application, a large quantity of system containers may be deployed on an independent server, and powerful capabilities of a central processing unit (CPU) and a graphics processing unit (GPU) on a server side may be fully used, to implement highly concurrent execution of system operations, thereby increasing the running speed of the cloud game.

Figure 1B:
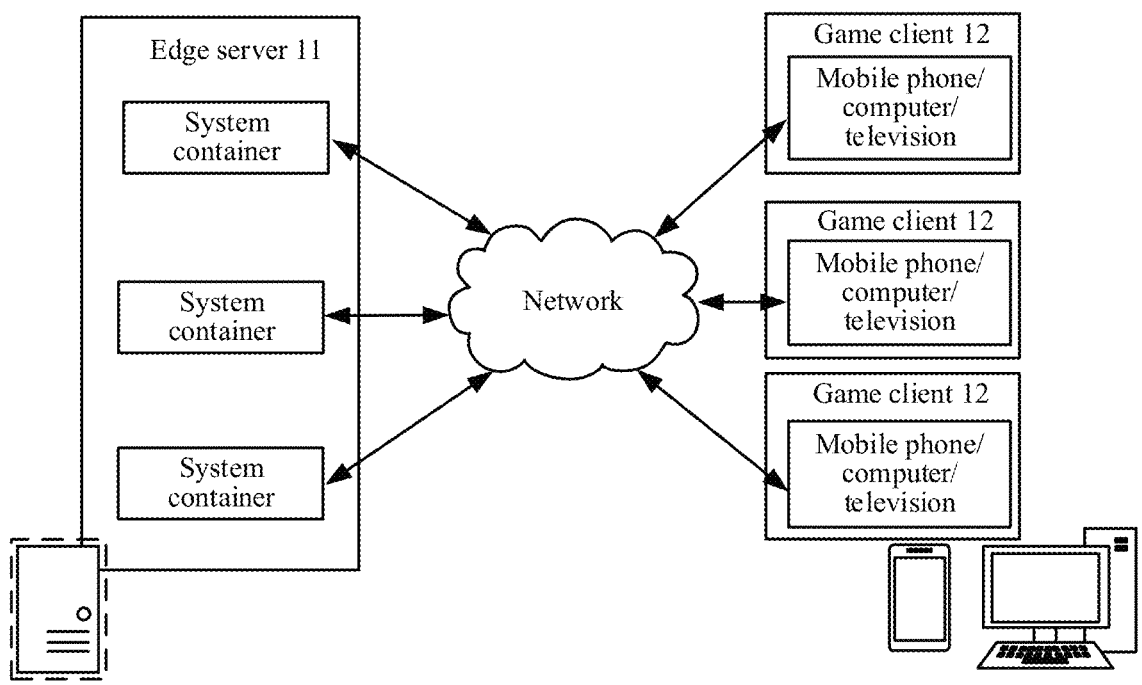
FIG. 1B is a schematic diagram of a connection between an edge server and a plurality of game clients according to an embodiment of this application.

Based on the cloud gaming environment mentioned above, an embodiment of this application provides a cloud gaming system. Referring to FIG. 1A, the cloud gaming system may include at least one edge server 11 and a plurality of game clients 12. The edge server 11 refers to a server configured to run the system container. The server may be any independent physical server, or may be a cloud server that provides basic cloud computing services such as a cloud service, a cloud database, cloud computing, a cloud function, cloud storage, a network service, cloud communication, a middleware service, a domain name service, a security service, a content delivery network (CDN), big data, and an AI platform. As shown in FIG. 1B, at least one system container may be deployed inside each edge server 11, and each system container may be connected to at least one game client 12. The each system container may be configured to run one or more games, and in a process of running any game, the each system container may transmit a game picture of the any game to the game client 12 to which the system container is connected for display. The game client 12 may be any terminal device (which is referred to as a terminal for short) having basic capabilities such as a streaming playback capability, a man-machine interaction capability, and a communication capability, for example, a smartphone, a tablet computer, a notebook computer, a desktop computer, a smart television, or the like. Alternatively, the game client 12 may be an application (APP) running on the terminal device. It is to be understood that, FIG. 1A exemplarily shows a system architecture of a cloud gaming system and is not intended to limit a specific architecture of the cloud gaming system. For example, in other embodiments, the cloud gaming system may further include a mirror server configured to produce the game image, and the like.

Figure 1C:
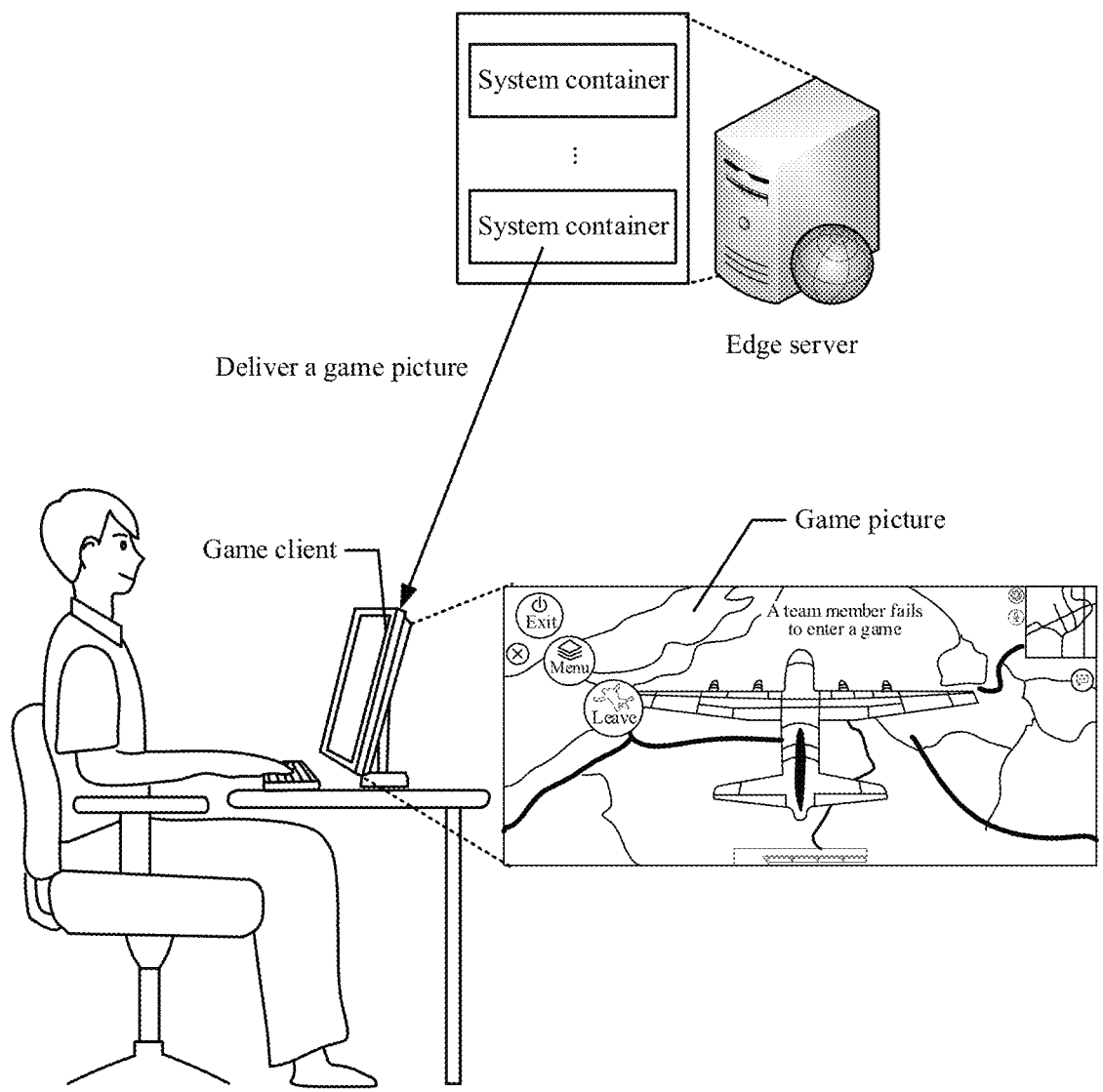
FIG. 1C is a schematic diagram of transmitting a game picture to a game client for display according to an embodiment of this application.

One or more cloud games may be run based on the foregoing cloud gaming system. A running principle of any cloud game is as follows: after a game image of a cloud game is produced, the game image of the cloud game may be deployed inside an edge server, so that the edge server may enable a corresponding system container by loading the game image. When receiving a connection request related to the cloud game sent by a game client, the edge server may allocate a corresponding system container to establish a connection to the game client. After the allocated system container and the game client are successfully connected, the allocated system container may run the cloud game and render a game picture of the cloud game in real time, and then transmit the rendered game picture to the game client through a video stream for display, as shown in FIG. 1C. In a process of displaying the game picture, the game client may send an operation event of a player for the game picture to the corresponding system container through a data stream. Correspondingly, the system container may be responsible for capturing and rendering a render buffer zone image (that is, a feedback image corresponding to the operation event) corresponding to the operation event, and returning the feedback image corresponding to the operation event to the game client for display.

When rendering the feedback image corresponding to the operation event, the system container usually involves image processing in several stages such as image shading, texture processing, and deformation. In view of this, an embodiment of this application provides a shared GPU shader cache mechanism for the image shading, to shorten a duration of performing the image shading, so that a rendering duration required for rendering the feedback image is shortened, and a total duration consumed during game running is shortened, thereby increasing the running speed of the cloud game. A GPU shader is a part of GPU hardware functions. When implemented by using software, a driver of the GPU may compile a GPU shader code written by a user into a target code executable by the GPU. A principle of a GPU shader cache mechanism is as follows: when a single system container caches a compilation result obtained by compiling the GPU shader code by the single system container to continuously run or rerun the cloud game in the single system container, if a same GPU shader code needs to be compiled by the system container, a compilation process may be skipped and the compilation result is directly used. Correspondingly, a principle of the shared GPU shader cache mechanism is as follows: a compilation result of a GPU shader code cached by a single system container is shared to other system containers, so that when a same GPU shader code needs to be compiled by the other system containers, a compilation process may be skipped and the shared compilation result is directly used.

In a specific implementation, the shared GPU shader cache mechanism provided in this embodiment of this application may mainly include the following two mechanisms:

(1) Static Shared GPU Shader Cache Mechanism

The static shared GPU shader cache mechanism refers to a shared mechanism in which a second compilation result of at least one GPU shader code is added to a game image, so that system containers loading the game image may all share the second compilation result. Specifically, a principle of the static shared GPU shader cache mechanism is generally as follows: the cloud game may be pre-run in a process of producing the game image of the cloud game; and in a process of running the cloud game, at least one GPU shader code is compiled to obtain the second compilation result, and then the second compilation result is added to the game image of the cloud game. In this way, when the game image of the cloud game is deployed inside system containers in different edge servers or different system containers in a same edge server, system containers loading the game image may all include the second compilation result. Further, when the system containers need to compile a GPU shader code, if the game image includes the second compilation results of the GPU shader code, a corresponding second compilation result may be directly obtained from the game image to perform subsequent processing, thereby increasing the running speed of a game. Based on the above, in the static shared GPU shader cache mechanism, since second compilation results of the GPU shader code are included in the game image, a problem of compilation result sharing between some identical games may be resolved without mounting an additional shared directory to the system container.

(2) Dynamic Shared GPU Shader Cache Mechanism

The dynamic shared GPU shader cache mechanism refers to a shared mechanism in which in the process of running the game, a same compilation result of the GPU shader code is shared between a plurality of system containers by using a shared directory. In a specific implementation, a principle of the dynamic shared GPU shader cache mechanism is generally as follows: in a process of running system containers, a shared directory may be mounted to the system containers as a GPU shader compilation cache directory, so that a first compilation result of each GPU shader code compiled by each system container in the process of running the game may be synchronously stored in the shared directory. In this way, when a GPU shader code needs to be compiled by a system container a, if the GPU shader code has been compiled by other system containers and a corresponding first compilation result has been cached in a target shared directory, the system container a may directly obtain the first compilation result from the target shared directory to perform subsequent processing, thereby increasing the running speed of the game.

In the dynamic shared GPU shader cache mechanism, since the shared directory may be mounted to a plurality of system containers, a compilation result of a GPU shader code newly generated by a single system container in a process of running a current game is cached in the shared directory, so that the compilation result may be dynamically shared and used by the plurality of system containers in real time. The first compilation result of the GPU shader code compiled by the single system container in the process of running the game is effectively used, to increase the running speed of a same game or different cloud games in other system containers. In view of this, the dynamic shared GPU shader cache mechanism provided in this embodiment of this application can resolve a problem of compilation result sharing between some identical games and resolve a problem of GPU shader cache sharing between some different games.

It can be learned from the foregoing description that, both the static shared GPU shader cache mechanism and the dynamic shared GPU shader cache mechanism provided in this embodiment of this application can resolve the problem of compilation result sharing between the system containers to some extent. In addition, the cached compilation result is used to directly perform subsequent processing without performing the compilation process of the GPU shader code, so that a code compilation duration can be effectively shortened, thereby increasing the running speed of the cloud game. It is to be understood that, in an actual application, two shared GPU shader cache mechanisms provided in this embodiment of this application can be used alone or used in combination. This is not limited in this embodiment of this application.

Figure 2:
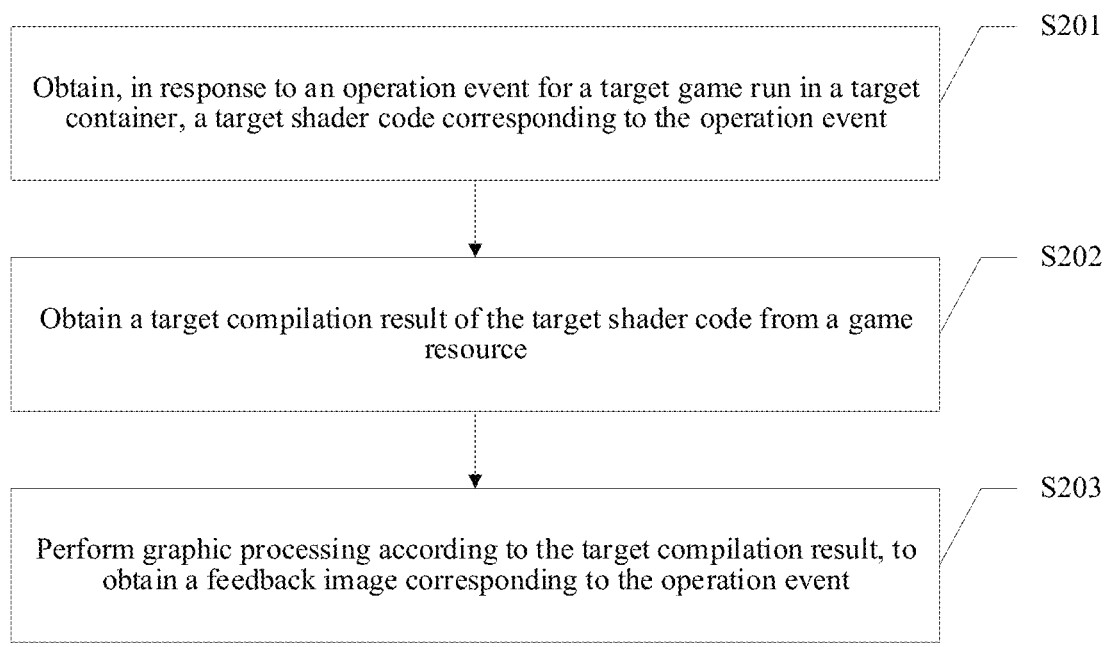
FIG. 2 is a schematic flowchart of an image processing method according to an embodiment of this application.

Based on the related description of the two shared GPU shader cache mechanisms, an embodiment of this application provides an image processing method. The image processing method may be performed by the target container running in the target edge server in the cloud gaming system mentioned above. The target edge server is any edge server in the cloud gaming system, and the target container is any system container running based on a server operating system of the target edge server. Referring to FIG. 2, the image processing method may include the following steps S201 to S203.

S201: Obtain, in response to an operation event for a target game run in a target container, a target shader code corresponding to the operation event.

The operation event is detected in a game picture of the target game displayed on a target game client that is connected to the target container. In a specific implementation, in a process of running the target game, the target container may send the game picture of the target game to the target game client through a video stream for display. Correspondingly, in a process of displaying the game picture, the target game client may detect whether there is an operation event for the target game. The operation event may include, but is not limited to: an event inputted by operating a physical control component (such as a mouse or a keyboard), an event inputted by controlling movement of a gravity sensing apparatus (such as a gyroscope), and an event inputted by touching any picture content on the game picture with a finger. After detecting the operation event, the target game client may transmit the operation event to the target container through a data stream. Correspondingly, after receiving the operation event, the target container may obtain a target shader code corresponding to the operation event.

S202: Obtain a target compilation result of the target shader code from a game resource.

In this embodiment of this application, the game resource may include at least one of the following: a game image of the target game and a target shared directory between the target container and an associated container of the target container. The game image of the target game may be obtained based on the static shared GPU shader cache mechanism mentioned above. The game image of the target game may include a second compilation result of at least one shader code (that is, a GPU shader code) compiled by pre-running the target game, and each second compilation result is added to the game image in a process of producing the game image. The target shared directory between the target container and the associated container may be obtained based on the dynamic shared GPU shader cache mechanism mentioned above. The target shared directory may include a first compilation result obtained by compiling at least one shader code by the associated container in a process of running the game. It is to be understood that, the target shared directory is not limited to a first compilation result of the associated container, and may further include the first compilation result obtained by compiling at least one shader code by the target container in the process of running the game. The associated container refers to a system container running an associated game of the target game. The associated game may include: the target game or a game using a same game engine as the target game.

It can be learned from the foregoing description that, in this embodiment of this application, the static shared GPU shader cache mechanism and the dynamic shared GPU shader cache mechanism mentioned above may be used alone or used in combination. The game resource may only include the game image of the target game when the static shared GPU shader cache mechanism is used alone. In this case, a specific implementation of step S202 may be that: when the game image of the target game includes a second compilation result of the target shader code, the second compilation result of the target shader code is directly obtained from the game image of the target game as the target compilation result; and when the game image of the target game does not include the second compilation result of the target shader code, the target shader code is compiled to obtain the target compilation result.

The game resource may only include the target shared directory between the target container and the associated container when the dynamic shared GPU shader cache mechanism is used alone. In this case, a specific implementation of step S202 may be that: in accordance with a determination that the target shared directory includes a first compilation result of the target shader code, directly obtaining the first compilation result of the target shader code from the target shared directory as the target compilation result; and in accordance with a determination that the game image of the target game does not include the first compilation result of the target shader code, compiling the target shader code to obtain the target compilation result. The first compilation result of the target shader code may be obtained by compiling the target shader code by the associated container when running the associated game; or may be obtained by compiling the target shader code by the target container in a historical process of running the target game. This is not limited in this embodiment of this application.

The game resource may include the game image of the target game and the target shared directory when the static shared GPU shader cache mechanism and the dynamic shared GPU shader cache mechanism are used in combination. In this case, a specific implementation of step S202 may be that: first detecting whether a second compilation result of the target shader code exists in the game image of the target game; obtaining the second compilation result of the target shader code from the game image as the target compilation result when the second compilation result exists; and obtaining the first compilation result from the target shared directory between the target container and the associated container of the target container as the target compilation result of the target shader code when the second compilation result does not exist. When the target compilation result fails to be obtained from the target shared directory, it indicates that the target compilation result does not exist in the target shared directory, that is, the target shader code has not been compiled by the target container and the associated container. In this case, the target container may compile the target shader code to obtain the target compilation result.

S203: Perform graphic processing according to the target compilation result, to obtain a feedback image corresponding to the operation event.

After step S203 is performed, the image processing method may further include: displaying the feedback image on the target game client.

After obtaining the target compilation result, the target container may perform a series of graphic processing according to the target compilation result by using the GPU, to obtain the feedback image corresponding to the operation event. The graphic processing may include, but is not limited to: alpha channel combining, and adjustment of a pixel value coordinate. After obtaining the feedback image, the target container may send the feedback image to the target game client through a video stream, to enable the target game client to display the feedback image.

In this embodiment of this application, after a target shader code corresponding to the operation event is obtained in response to an operation event for a target game run in a target container, a compilation process of the target shader code may be skipped to directly obtain a target compilation result of the target shader code from a game image or a target shared directory between the target container and an associated container of the target container. Then, graphic processing may be performed according to the target compilation result, to obtain a feedback image corresponding to the operation event; and the feedback image is displayed on a target game client. It can be seen that, in this embodiment of this application, graphic processing is performed by directly using the target compilation result compiled from the game image or the associated container in the target shared directory, so that a duration of compiling the target shader code can be effectively shortened, thereby increasing the running speed of a target game.

Based on the related description of the embodiments of the image processing method shown in FIG. 2, a specific process of producing the game image of the target game and a specific process of mounting the target shared directory involved in the method embodiment shown in FIG. 2 are respectively described as follows.

Figure 3A:
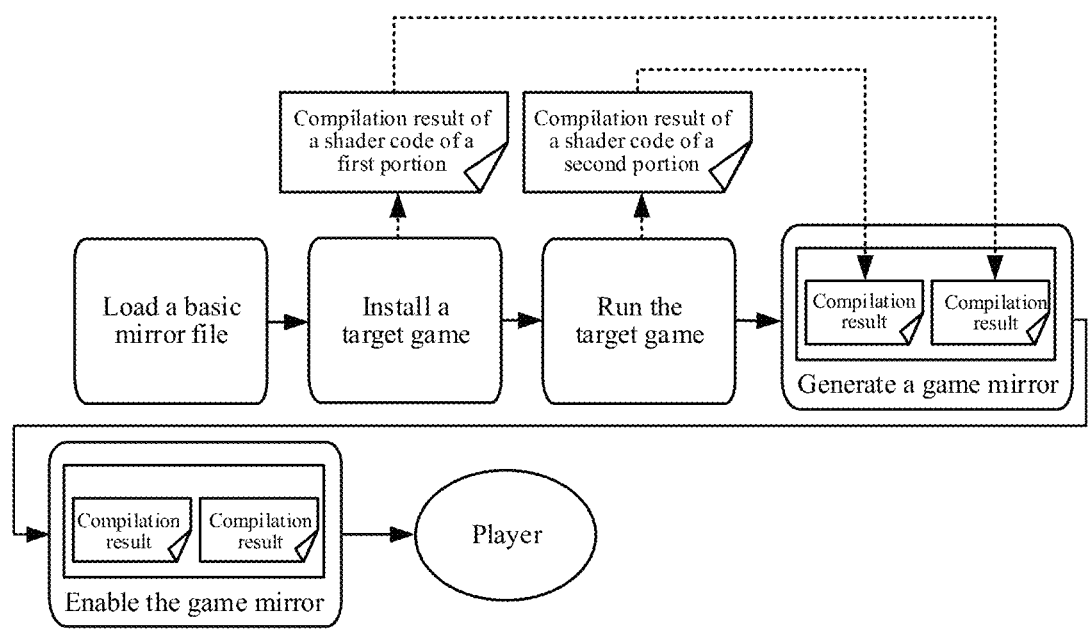
FIG. 3A is a schematic diagram of producing a game image according to an embodiment of this application.

(1) Produce the Game Image of the Target Game Based on a Static Shared GPU Shader Cache Mechanism Referring to FIG. 3A, in a process of producing the game image of the target game, a basic mirror (such as an Android basic mirror) of a device operating system may be first loaded; then the target game may be installed to trigger compilation of a GPU shader code of a first portion related to the target game, to obtain a compilation result of the first portion; and the compilation result of the first portion is added to the game image of the target game. In an implementation, the compilation result of the first portion and the GPU shader code of the first portion may be directly added to the game image of the target game correspondingly. In another implementation, the compilation result of the first portion and an index value of the GPU shader code of the first portion may be added to the game image of the target game correspondingly. The index value may be obtained by performing a hash operation on the GPU shader code. Then, the target game may be run and an analog operation event for the target game may be inputted to trigger compilation of a GPU shader code of a second portion corresponding to the analog operation event, to obtain a compilation result of the second portion. Further, the compilation result of the second portion is added to the game image of the target game. In an implementation, the compilation result of the second portion and the GPU shader code of the second portion may be directly added to the game image of the target game correspondingly. In another implementation, the compilation result of the second portion and an index value of the GPU shader code of the second portion may be added to the game image of the target game correspondingly.

(2) Mount the Target Shared Directory Based on the Dynamic Shared GPU Shader Cache Mechanism First, the target edge server may select the target shared directory. Then, the target shared directory may be mounted to the target container and the associated container, so that in a process of running games in the target container and the associated container, a first compilation result of each compiled GPU shader code may be synchronously cached in the target shared directory. Specifically, the target edge server may generate a directory mounting instruction carrying the target shared directory; and respectively send the directory mounting instruction to the target container and the associated container, so that the target container may mount the target shared directory to a dynamic cache directory in the target container, and the associated container may mount the target shared directory to a preset directory in the associated container. After the target shared directory is successfully mounted to the target container and the associated container, when the associated container has compiled at least one GPU shader code and obtained a corresponding first compilation result during running, the first compilation result obtained by compiling the GPU shader code by the associated container may be added to the target shared directory. Similarly, when the target container has compiled at least one GPU shader code and obtained a corresponding first compilation result during running, the first compilation result obtained by compiling the GPU shader code by the target container may be added to the target shared directory.

The target shared directory may support two selection manners.

In a first selection manner, a target shared directory (for example, /home/shadercache) on a server host (that is, a host) on which the server operating system of the target edge server resides is selected for use by all system containers running on the target edge server. In this selection manner, the target shared directory is located in the server host on which the server operating system resides. In an actual application, since the system container may generate a first compilation result of a corresponding GPU shader code in a process of running different types of cloud games, a data volume of first compilation results of GPU shader codes accumulated by a plurality of system containers is usually relatively large. When the plurality of system containers are mounted to a same shared directory, a data volume of compilation results cached in the shared directory is relatively large, and consequently it takes a relatively long time consumed to search the shared directory for a compilation result of a related GPU shader code. In view of this, the server host may determine, according to a quantity of types of the cloud games run on the system containers in the target edge server, a quantity of shared directories to be provided.

Figure 3B:
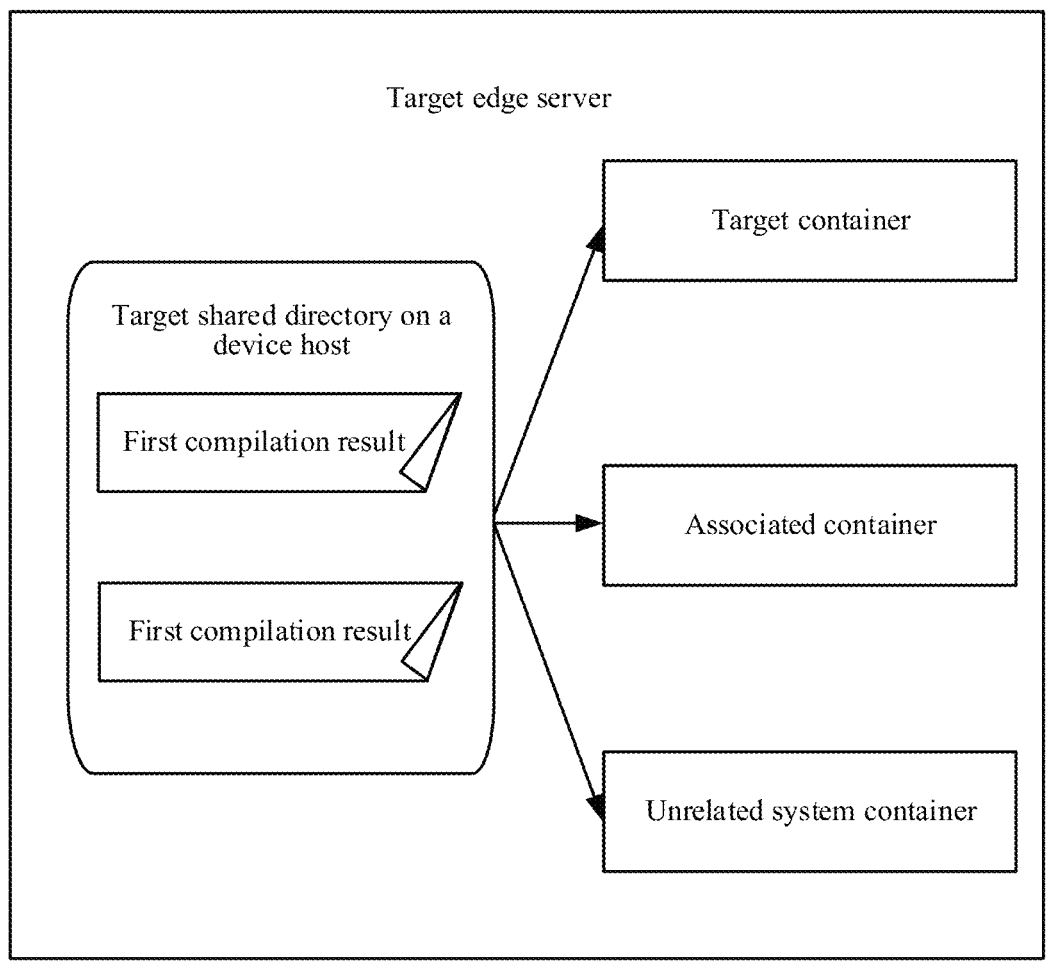
FIG. 3B is a schematic diagram of mounting a target shared directory according to an embodiment of this application.

When the quantity of types of the cloud games run on each system container in the target edge server is relatively small (that is, the quantity of types of the cloud games is less than a quantity threshold), the server host may provide only one shared directory, so that the each system container in the target edge server may be mounted to the shared directory. In this case, the target edge server may use the shared directory provided by the server host as the target shared directory between the target container and the associated container. That is, in this implementation, FIG. 3B is a schematic diagram of mounting a target shared directory by a target container. As shown in FIG. 3B, since the server host only includes the target shared directory, the target shared directory may be used for mounting the target container and the associated container of the target container and also used for mounting system containers in the target edge server that are not related to the target container.

Figure 3C:
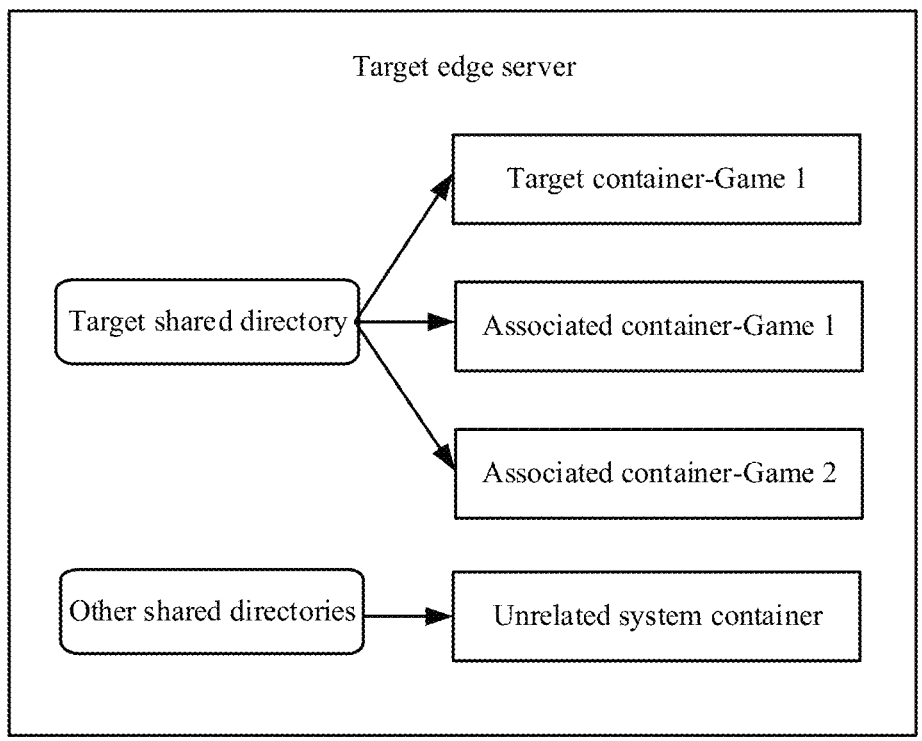
FIG. 3C is another schematic diagram of mounting a target shared directory according to an embodiment of this application.

When the quantity of types of the cloud games run on the system containers in the target edge server is relatively large (that is, the quantity of types of the cloud games is greater than or equal to the quantity threshold), the server host may provide a plurality of shared directories. In this case, for related system containers running a same cloud game or related system containers of a cloud game sharing a same game engine, the related system containers are more likely to use a same GPU shader code, and therefore the related system containers may be mounted to a same shared directory. In addition, for unrelated system containers, the unrelated system containers may be mounted to other shared directories on the server host. In this case, the target edge server may randomly select a shared directory from the plurality of shared directories provided by the server host as the target shared directory between the target container and the associated container. That is, in this implementation, FIG. 3C is a schematic diagram of mounting a target shared directory by a target container. As shown in FIG. 3C, the server host may include the target shared directory and also include other shared directories other than the target shared directory. Therefore, the target shared directory may only be used for mounting the target container and the associated container of the target container, and the other shared directories in the server host may be used for mounting the system containers in the target edge server that are not related to the target container. It is to be understood that, when there are a large quantity of cloud games, the server host may still provide only one shared directory if an indicator of the time consumed to search the target shared directory for a compilation result of a related GPU shader code is ignored.

In a second selection manner, a target shared directory (for example, 192.168.10.10:/mnt/share) is selected from a network file system on the Internet for use by system containers in all edge servers on the Internet. The network file system is independent of each edge server in the cloud gaming system and allows access by a system container of the each edge server. In this selection manner, the target shared directory is located in the network file system. In a specific implementation, similar to the reason why the server host determines, according to a quantity of types of the cloud games run on the system containers in the target edge server, a quantity of shared directories to be provided, the network file system may also determine, according to the quantity of types of the cloud games run on the system containers in the target edge server, the quantity of shared directories to be provided.

Figure 3D:
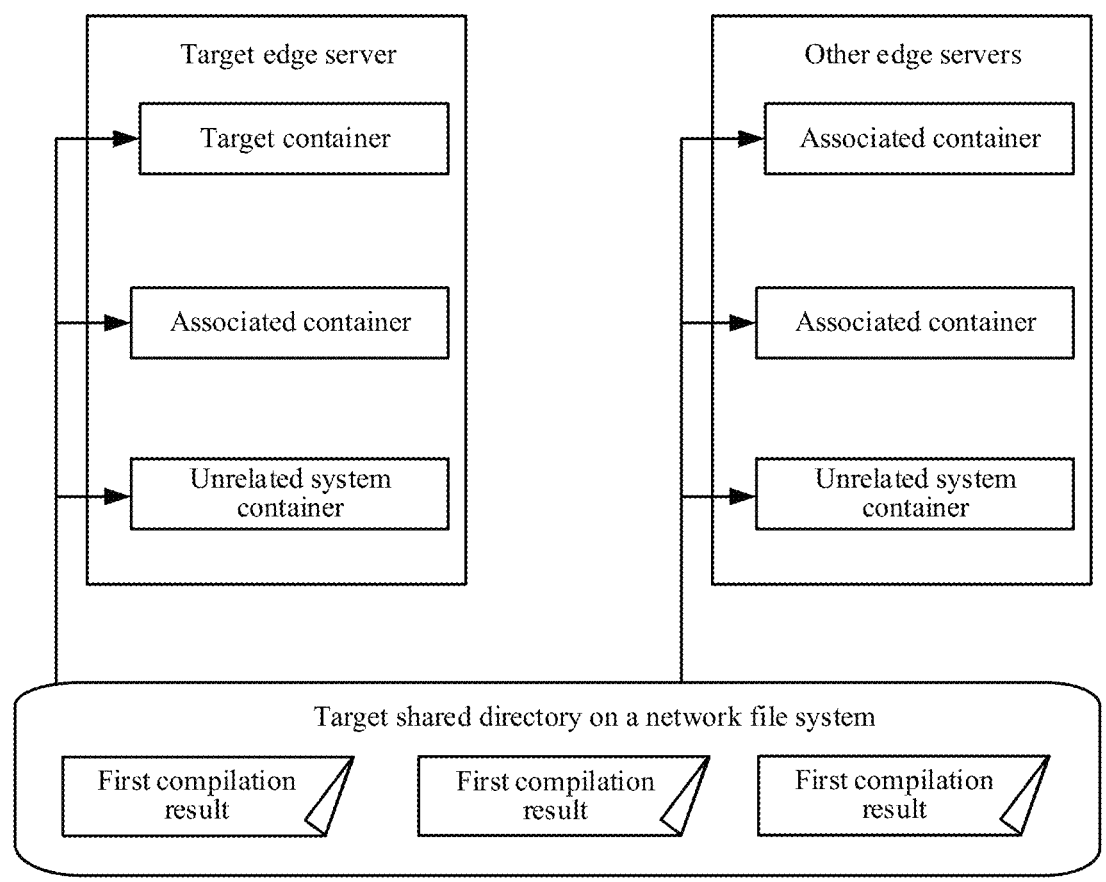
FIG. 3D is still another schematic diagram of mounting a target shared directory according to an embodiment of this application.

When a quantity of types of cloud games run on each system container in each edge server in the cloud gaming system is relatively small (that is, the quantity of types of the cloud games is less than the quantity threshold), the network file system may provide only one shared directory, so that the each system container in the cloud gaming system may be mounted to the shared directory. In this case, the target edge server may use the shared directory provided by the network file system as the target shared directory between the target container and the associated container. That is, in this implementation, FIG. 3D is a schematic diagram of mounting a target shared directory by a target container. As shown in FIG. 3D, since the network file system only includes the target shared directory, the target shared directory may be used for mounting the target container and the associated container of the target container and also used for mounting system containers in the cloud gaming system that are not related to the target container.

Figure 3E:
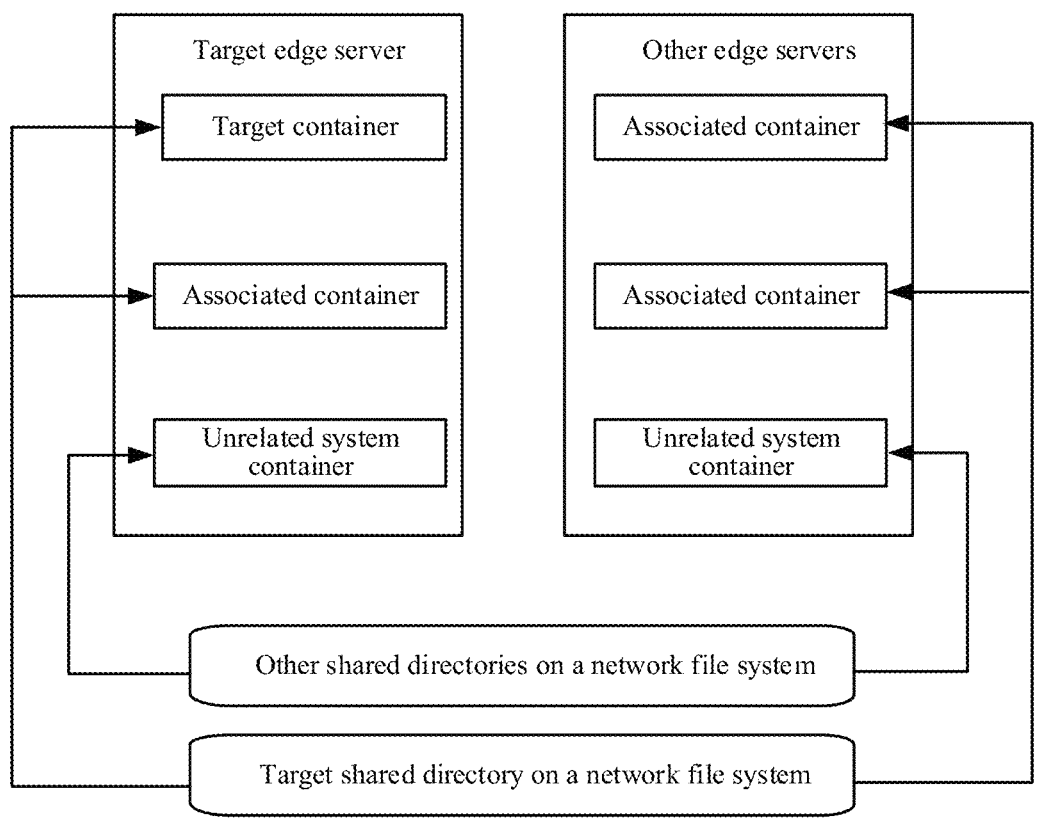
FIG. 3E is yet another schematic diagram of mounting a target shared directory according to an embodiment of this application.

When the quantity of types of the cloud gaming run on each system container in each edge server in the cloud gaming system is relatively large (that is, the quantity of types of the cloud games is greater than or equal to the quantity threshold), the network file system may provide a plurality of shared directories. In this case, for related system containers running a same cloud game or related system containers of a cloud game sharing a same game engine, the related system containers are more likely to use a same GPU shader code, and therefore the related system containers may be mounted to a same shared directory. In addition, for unrelated system containers, the unrelated system containers may be mounted to other shared directories on the network file system. In this case, the target edge server may randomly select a shared directory from the plurality of shared directories provided by the network file system as the target shared directory between the target container and the associated container. That is, in this implementation, FIG. 3E is a schematic diagram of mounting a target shared directory by a target container. As shown in FIG. 3E, the network file system may include the target shared directory and also include other shared directories other than the target shared directory. Therefore, the target shared directory may only be used for mounting the target container and the associated container of the target container, and the other shared directories in the network file system may be used for mounting the system containers in the cloud gaming system that are not related to the target container. It is to be understood that, when there are a large quantity of cloud games, the network file system may provide only one shared directory if an indicator of the time consumed to search the target shared directory for a compilation result of a related GPU shader code is ignored.

In an actual application, the target edge server may randomly select either of the foregoing two selection manners to determine the target shared directory. Further, in the first selection manner, the target shared directory is selected from the server host, and both the target shared directory and the target container exist on the target edge server. Therefore, an access speed of the target container to each first compilation result in the target shared directory can be ensured. However, in the second manner, the target shared directory is selected from the network file system, and the network file system and the target edge server are independent of each other. Therefore, the access speed of the target container to each first compilation result in the target shared directory may be relatively low due to factors such as network congestion. In view of this, the target edge server may select one selection manner from the foregoing two selection manners according to an actual condition of the access speed of the network file system, to determine the target shared directory. Specifically, when the access speed of the network file system cannot be ensured, the first selection manner may be selected to determine the target shared directory; and when the access speed of the network file system can be ensured, the second selection manner may be selected to determine the target shared directory.

It is to be understood that the selecting the selection manner according to a parameter such as the access speed of the network file system described in this embodiment of this application is merely exemplary rather than exhaustive. That is, in other embodiments, the selection manner may be selected according to other parameters. For example, since the first selection manner is to select the target shared directory from the server host, each first compilation result in the target shared directory cannot be accessed by system containers in other edge servers. However, since the second selection manner is to select the target shared directory from the network file system, the each first compilation result in the target shared directory can be accessed by the system containers in the other edge servers. In view of this, the target edge server may select one selection manner from the foregoing two selection manners according to an actual gaming deployment requirement, to determine the target shared directory. Specifically, when the gaming deployment requirement indicates that there is no need to share compilation results between different edge servers, the first selection manner may be selected to determine the target shared directory; and when the gaming deployment requirement indicates that there is a need to share compilation results between different edge servers, the second selection manner is selected to determine the target shared directory.

Figure 4:
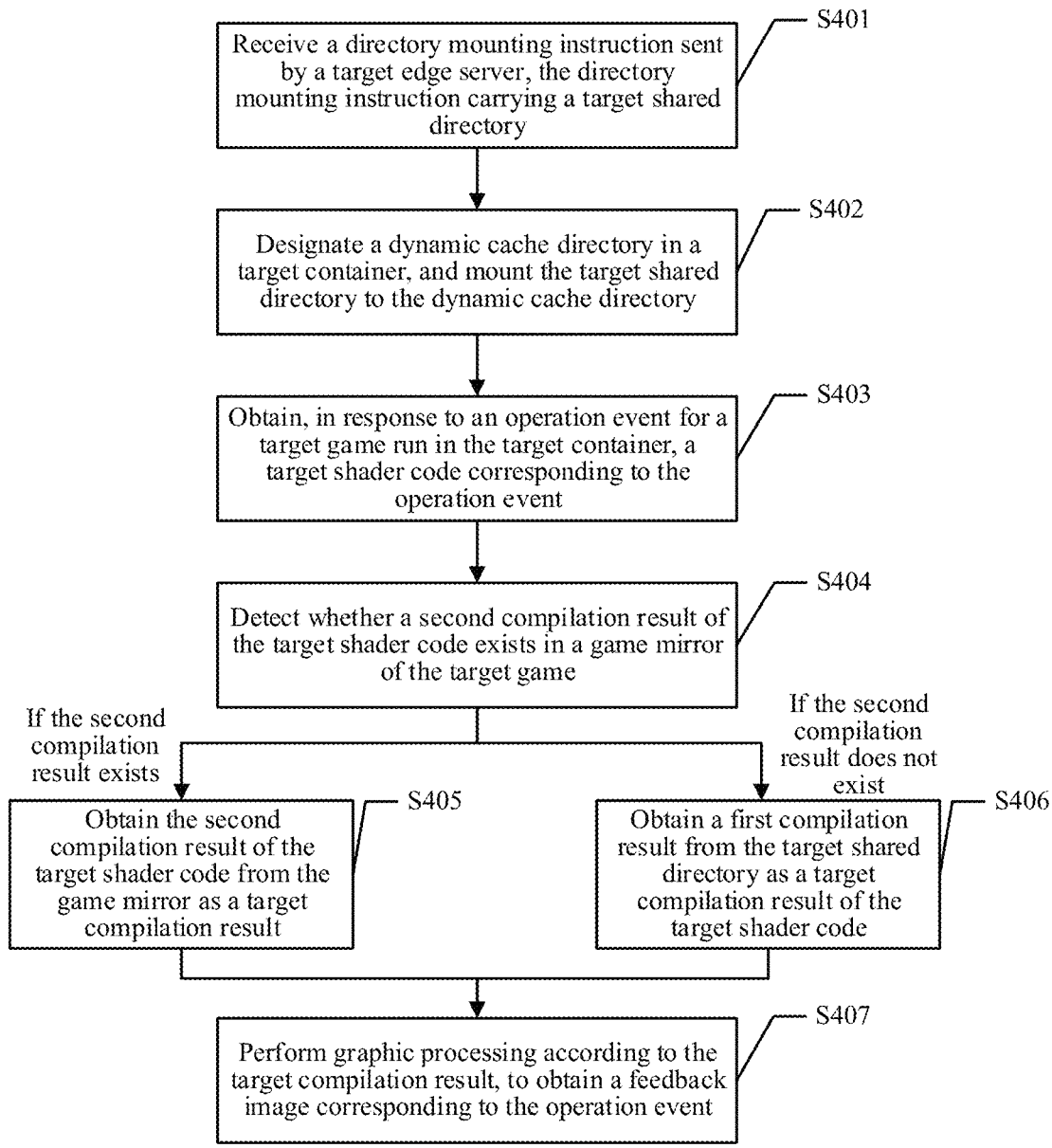
FIG. 4 is a schematic flowchart of another image processing method according to another embodiment of this application.

Further, based on the related description of the embodiments of the image processing method shown in FIG. 2, the specific process of producing the game image of the target game based on the static shared GPU shader cache mechanism, and the specific process of mounting the target shared directory based on the dynamic shared GPU shader cache mechanism, an embodiment of this application further provides a more specific schematic flowchart of an image processing method. In this embodiment of this application, the description is provided mainly by using an example in which the static shared GPU shader cache mechanism and the dynamic shared GPU shader cache mechanism are used in combination. The image processing method may be performed by the target container running in the target edge server in the cloud gaming system mentioned above. The target container is enabled by loading the game image of the target game, and the game image of the target container may include a second compilation result of at least one shader code compiled by pre-running the target game. Referring to FIG. 4, the image processing method may include the following steps S401 to S407.

S401: Receive a directory mounting instruction sent by the target edge server, the directory mounting instruction carrying the target shared directory.

S402: Designate a dynamic cache directory in the target container, and mount the target shared directory to the dynamic cache directory.

In an implementation, one directory may be designated in the target container as the dynamic cache directory. That is, in this implementation, the dynamic cache directory may be the same as or different from a storage directory of the second compilation result in the game image. In another implementation, when the target shared directory is mounted inside the target container, files in a corresponding directory inside the target shared directory to which the target shared directory is mounted may be cleared due to a limitation by a container directory mounting implementation. Therefore, to prevent the second compilation result in the game image from being cleared, two different environment variables may be used inside the target container to respectively designate the dynamic cache directory used for mounting the target shared directory and the storage directory of the second compilation result in the game image, so that the dynamic cache directory and the storage directory of the second compilation result are separated. In this way, when the target shared directory is mounted to the dynamic cache directory, only files in the dynamic cache directory are cleared, and the second compilation result in the storage directory is not affected.

In this implementation, the dynamic cache directory may be designated by using a first environment variable. The first environment variable may include, but is not limited to an environment variable "MESA_GLSL_CACHE_DIR" in a Mesa code. The storage directory of the second compilation result in the game image may be designated by using a second environment variable. Specifically, the second environment variable may include, but is not limited to an environment variable "MESA_GLSL_CACHE_DIR_STATIC" in the Mesa code. Mesa is an open-source computer graphics library. Mesa may be used for implementing an application interface of opengl/opengles. Opengl is mainly a cross-platform application programming interface (API) used for rendering 3D graphics. Opengles is a subset of the opengl API and is mainly used in an embedded device (such as a smartphone).

Figure 5A:
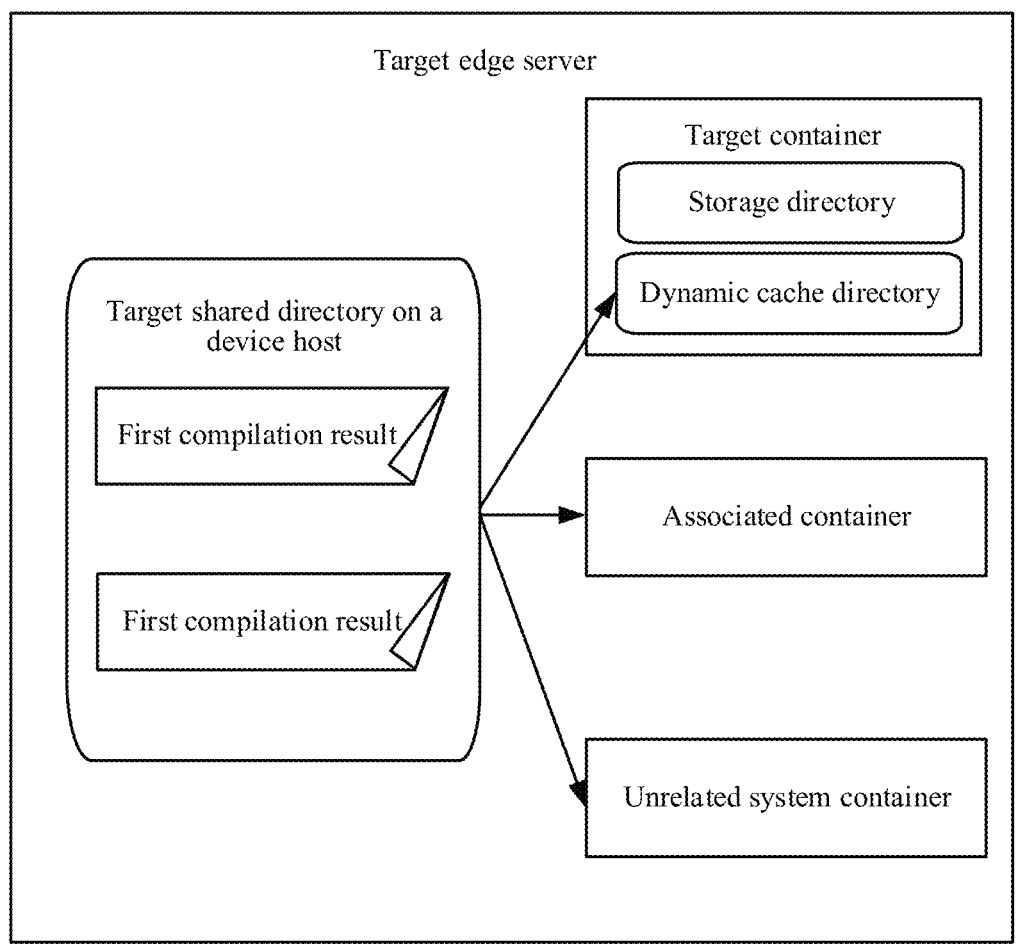
FIG. 5A is a schematic diagram of mounting a target shared directory according to another embodiment of this application.
Figure 5B:
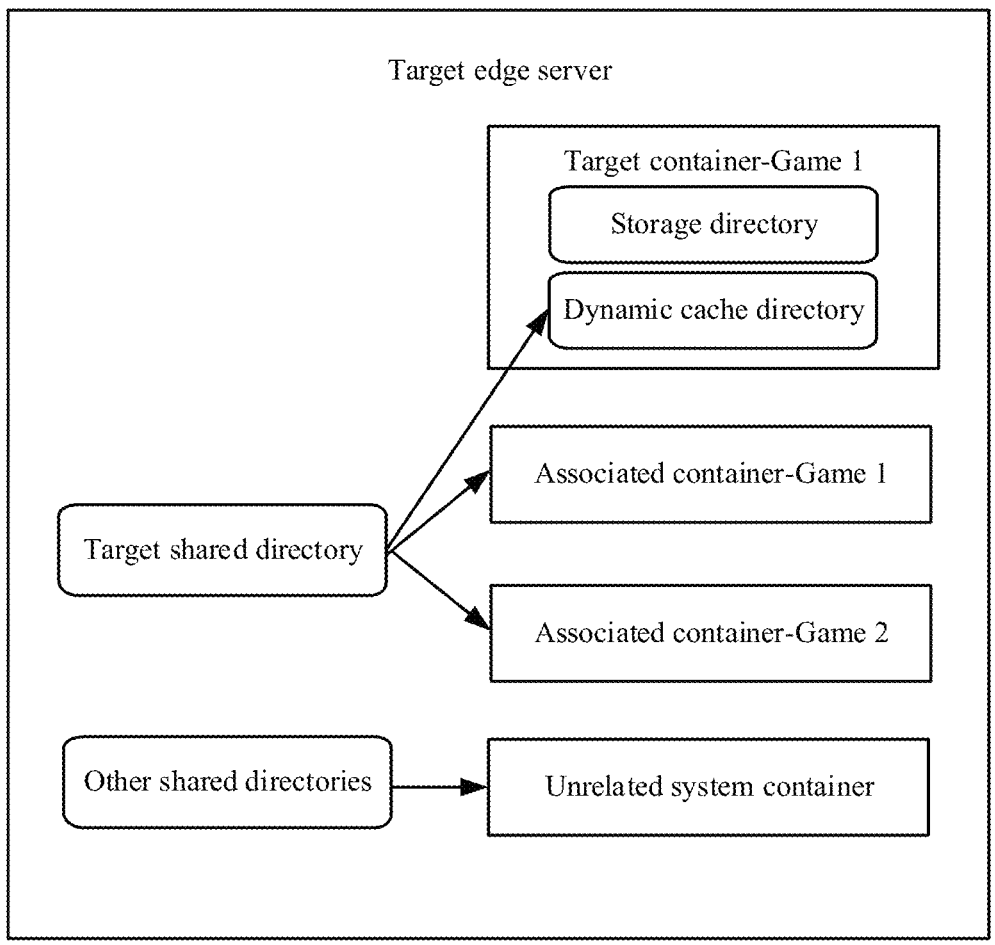
FIG. 5B is another schematic diagram of mounting a target shared directory according to another embodiment of this application.
Figure 5C:
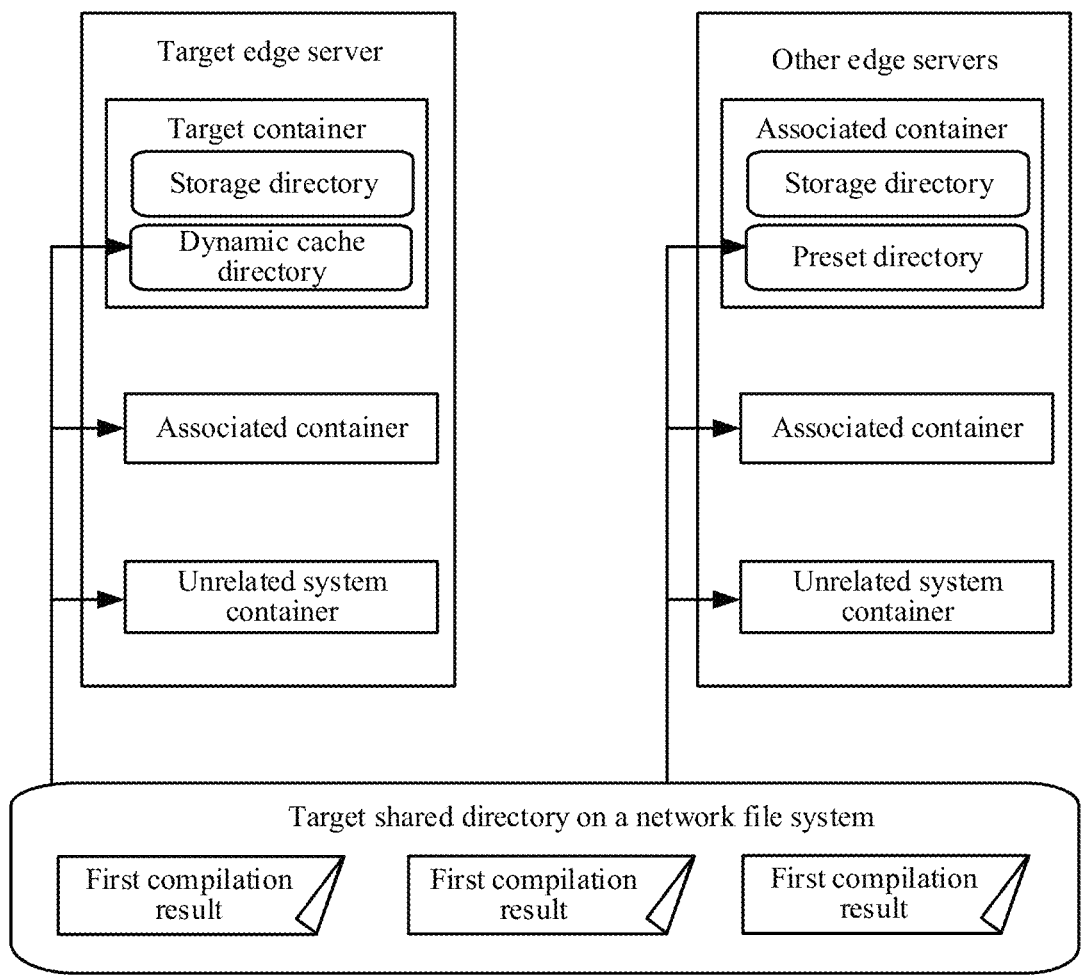
FIG. 5C is still another schematic diagram of mounting a target shared directory according to another embodiment of this application.
Figure 5D:
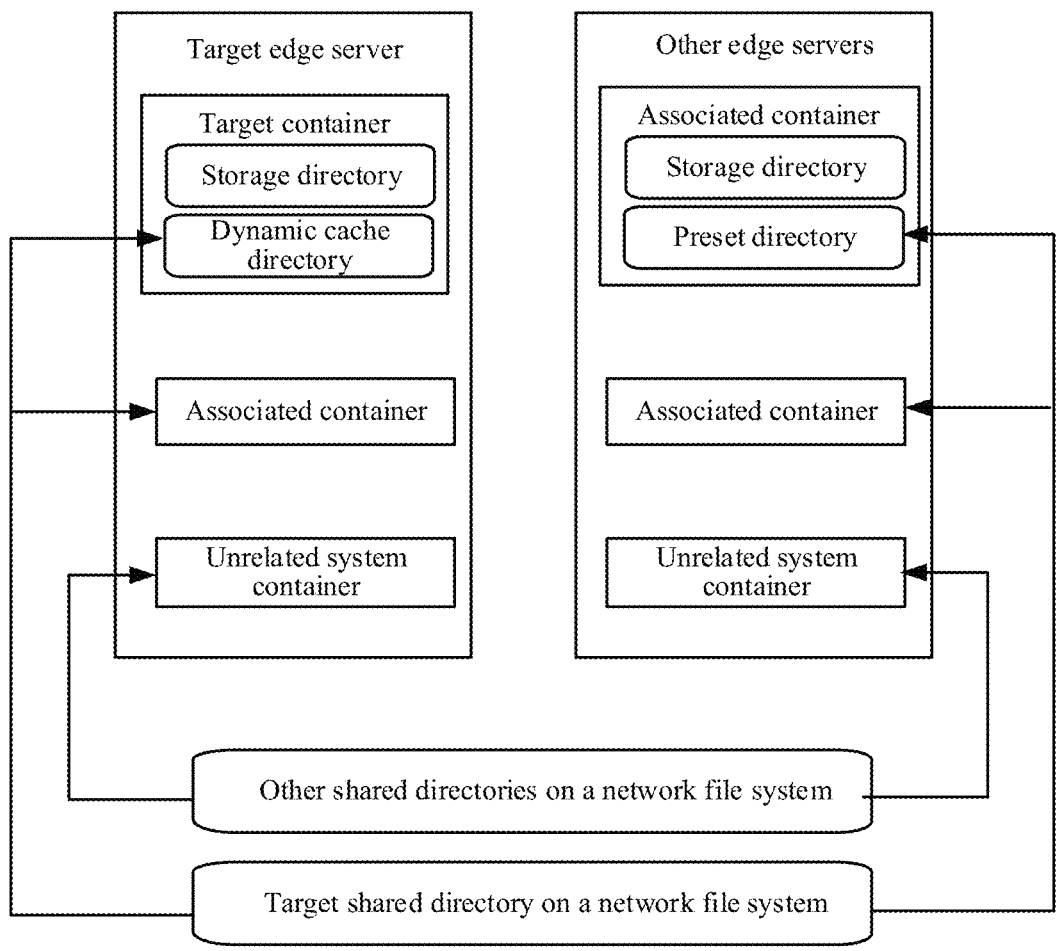
FIG. 5D is yet another schematic diagram of mounting a target shared directory according to another embodiment of this application.

After the dynamic cache directory is designated in the target container, the target shared directory may be mounted to the dynamic cache directory, to keep data between the target shared directory and the dynamic cache directory synchronized. The target shared directory is also mounted to a preset directory of the associated container, to cache the first compilation result obtained by compiling at least one shader code by the associated container in a process of running the associated game. For example, when the target shared directory is located on the server host, if the server host only includes the target shared directory, reference may be made to FIG. 5A for a schematic diagram of mounting the target shared directory; and if the server host includes the target shared directory and other shared directories, reference may be made to FIG. 5B for a schematic diagram of mounting the target shared directory. In another example, when the target shared directory is located on the network file system, if the network file system only includes the target shared directory, reference may be made to FIG. 5C for a schematic diagram of mounting the target shared directory; and if the network file system includes the target shared directory and other shared directories, reference may be made to FIG. 5D for a schematic diagram of mounting the target shared directory.

S403: Obtain, in response to an operation event for a target game run in a target container, a target shader code corresponding to the operation event.

S404: Detect whether a second compilation result of the target shader code exists in the game image of the target game.

Based on the above, the game image may include a second compilation result of at least one shader code compiled by pre-running the target game. In an implementation, the game image may further include a shader code corresponding to each second compilation result. In this implementation, it may be directly detected whether the target shader code is included in the game image of the target game. It may be determined that the second compilation result of the target shader code exists in the game image when the target shader code is included in the game image; and it may be determined that the second compilation result of the target shader code does not exist in the game image when the target shader code is not included in the game image.

In another implementation, the game image may further include an index value of at least one shader code, and each index value corresponds to one second compilation result. Therefore, in this implementation, a hash operation may be performed on the target shader code, to obtain a target index value of the target shader code. Then, it is detected whether the target index value is included in the game image. It may be determined that the second compilation result of the target shader code exists in the game image when the target index value is included in the game image; and it may be determined that the second compilation result of the target shader code does not exist in the game image when the target index value is not included in the game image.

Step S405 may be performed when the second compilation result of the target shader code exists in the game image; and step S406 may be performed when the second compilation result of the target shader code does not exist in the game image.

Step S405: Obtain the second compilation result of the target shader code from the game image as the target compilation result when the second compilation result exists.

Step S406: Obtain the first compilation result from the target shared directory between the target container and the associated container of the target container as the target compilation result of the target shader code when the second compilation result does not exist.

Figure 5E:
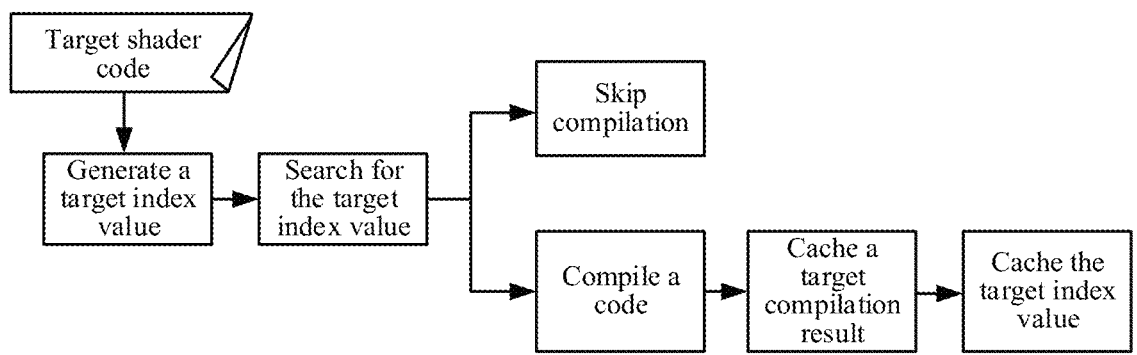
FIG. 5E is a schematic diagram of caching a target compilation result according to an embodiment of this application.

In a specific implementation, the target shared directory may include a first compilation result of at least one shader code, and each first compilation result may correspond to one index value. Reference may be made to FIG. 5E together for a specific implementation of step S406. Specifically, the target container may search the target shared directory to determine whether a target index value exists. When the target index value exists, a code compilation process may be skipped to directly obtain a first compilation result corresponding to the target index value as the target compilation result. When the target shader code does not exist, it indicates that the game resource does not include the target compilation result of the target shader code. Therefore, the target shader code may be compiled to obtain the target compilation result; and the target compilation result is cached to the dynamic cache directory, to synchronize the target compilation result to the target shared directory, so that the associated container directly obtains the target compilation result from the target shared directory when the target shader code needs to be compiled. In addition, the target index value of the target shader code may be cached to the dynamic cache directory together, to synchronize the target index value to the target shared directory.

S407: Perform graphic processing according to the target compilation result, to obtain a feedback image corresponding to the operation event. After step S407 is performed, the image processing method may further include: displaying the feedback image on the target game client.

In this embodiment of this application, after a target shader code corresponding to the operation event is obtained in response to an operation event for a target game run in a target container, a compilation process of the target shader code may be skipped to directly obtain a target compilation result of the target shader code from a game image or a target shared directory between the target container and an associated container of the target container. Then, graphic processing may be performed according to the target compilation result, to obtain a feedback image corresponding to the operation event; and the feedback image is displayed on a target game client. It can be seen that, in this embodiment of this application, graphic processing is performed by directly using the target compilation result compiled from the game image or the associated container in the target shared directory, so that a duration of compiling the target shader code can be effectively shortened, thereby increasing the running speed of a target game.

Figure 6:
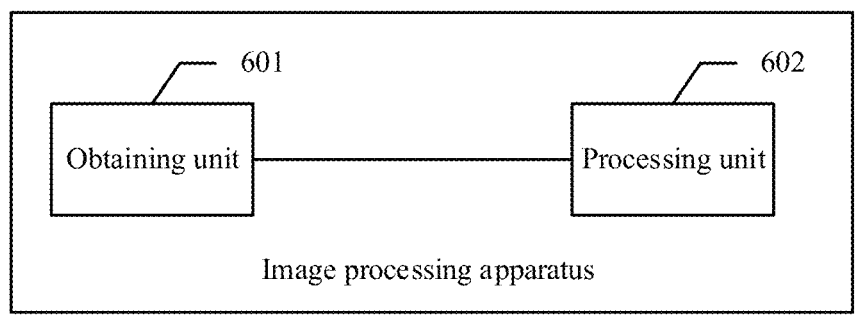
FIG. 6 is a schematic structural diagram of an image processing apparatus according to an embodiment of this application.

Based on the foregoing description of the embodiments of the image processing method, an embodiment of this application further discloses an image processing apparatus. The image processing apparatus may be a computer program (including program code) run in the target edge server. The image processing apparatus may perform the method shown in FIG. 2 or FIG. 4. Referring to FIG. 6, the image processing apparatus may operate the following units:

an obtaining unit 601, configured to obtain, in response to an operation event for a target game run in a target container, a target shader code corresponding to the operation event, the operation event being detected in a game picture of the target game displayed on a target game client that is connected to the target container; and the obtaining unit 601 being further configured to obtain a target compilation result of the target shader code from a game resource, the game resource including at least one of the following: a game image of the target game and a target shared directory between the target container and an associated container of the target container, the target shared directory including a first compilation result obtained by compiling at least one shader code by the associated container in a process of running the game; and a processing unit 602, configured to: perform graphic processing according to the target compilation result, to obtain a feedback image corresponding to the operation event; and display the feedback image on the target game client.

In an implementation, the game resource includes the game image and the target shared directory; the game image includes a second compilation result of at least one shader code compiled by pre-running the target game, and each second compilation result is added to the game image in a process of producing the game image; and Correspondingly, when the obtaining unit 601 is configured to obtain the target compilation result of the target shader code from the game resource, the obtaining unit 601 may further be configured to:
- detect whether a second compilation result of the target shader code exists in the game image of the target game;
- obtain the second compilation result of the target shader code from the game image as the target compilation result in accordance with a determination that the second compilation result exists; and
- obtain the first compilation result from the target shared directory between the target container and the associated container of the target container as the target compilation result of the target shader code in accordance with a determination the second compilation result does not exist.

In another implementation, the game image further includes an index value of at least one shader code, and each index value corresponds to one second compilation result. Correspondingly, when the obtaining unit 601 is configured to detect whether a second compilation result of the target shader code exists in the game image of the target game, the obtaining unit 601 may further be configured to:
- perform a hash operation on the target shader code, to obtain a target index value of the target shader code;
- determine that the second compilation result of the target shader code exists in the game image in accordance with a determination the target index value is included in the game image; and
- determine that the second compilation result of the target shader code does not exist in the game image in accordance with a determination the target index value is not included in the game image.

In another implementation, the target game is a cloud game in a cloud gaming system, and the cloud gaming system includes at least one edge server and a plurality of game clients; at least one system container is deployed inside each edge server, and each system container is connected to at least one game client; and
- the each system container is configured to run one or more games, and in a process of running any game, the each system container transmits a game picture of the any game to the game client to which the system container is connected for display, where
- the target container is any system container running based on a server operating system of a target edge server, and the target edge server is any edge server in the cloud gaming system; and the associated container is a system container running an associated game of the target game, and the associated game includes: the target game or a game using a same game engine as the target game.

In another implementation, the processing unit 602 may further be configured to:
- receive a directory mounting instruction transmitted by the target edge server, the directory mounting instruction carrying the target shared directory; and
- designate a dynamic cache directory in the target container, and mount the target shared directory to the dynamic cache directory, to keep data between the target shared directory and the dynamic cache directory synchronized, where
- the target shared directory is also mounted to a preset directory of the associated container, to cache the first compilation result obtained by compiling at least one shader code by the associated container in a process of running the associated game.

In another implementation, the dynamic cache directory is designated by using a first environment variable, and the second compilation result is designated in a storage directory of the game image by using a second environment variable.

In another implementation, the target shared directory is located in a server host on which the server operating system resides. Alternatively,
- the target shared directory is located in a network file system, and the network file system is independent of each edge server in the cloud gaming system and allows assess by a system container of the each edge server.

In another implementation, when the target shared directory is located in the server host, the server host further includes other shared directories other than the target shared directory, and the other shared directories in the server host are used for mounting system containers in the target edge server that are not related to the target container.

When the target shared directory is located in the network file system, the network file system further includes other shared directories other than the target shared directory, and the other shared directories in the network file system are used for mounting system containers in the cloud gaming system that are not related to the target container.

In another implementation, the game resource does not include the target compilation result of the target shader code. Correspondingly, the processing unit 602 may further be configured to:
- in accordance with a determination that the game resource does not include the target compilation result, compile the target shader code to obtain the target compilation result; and
- cache the target compilation result to the dynamic cache directory to synchronize the target compilation result to the target shared directory, the target compilation result is provided to the associated container from the target shared directory in response to a subsequent request for compiling the target shader code.

According to an embodiment of this application, the steps involved in the method shown in FIG. 2 or FIG. 4 may be performed by the units of the image processing apparatus shown in FIG. 6. For example, steps S201 and S202 shown in FIG. 2 may be performed by the obtaining unit 601 shown in FIG. 6, and step S203 may be performed by the processing unit 602 shown in FIG. 6. In another example, steps S401, S402, and S407 shown in FIG. 4 may be performed by the processing unit 602 shown in FIG. 6, and steps S403 to S406 may be performed by the obtaining unit 601 shown in FIG. 6.

According to another embodiment of this application, the units of the image processing apparatus shown in FIG. 6 may be separately or wholly combined into one or several other units, or one (or more) of the units may further be divided into a plurality of units of smaller functions. In this way, same operations may be implemented, and the implementation of the technical effects of the embodiments of this application is not affected. The foregoing units are divided based on logical functions. In an actual application, a function of one unit may also be implemented by a plurality of units, or functions of a plurality of units are implemented by one unit. In other embodiments of this application, the image processing apparatus may also include other units. In an actual application, the functions may also be cooperatively implemented by other units and may be cooperatively implemented by a plurality of units.

According to another embodiment of this application, a computer program (including program code) that can perform the steps in the corresponding method shown in FIG. 2 or FIG. 4 may be run on a general-purpose computing device such as a computer, which includes processing elements and storage elements such as a CPU, a random access memory (RAM), and a read-only memory (ROM), to construct the image processing apparatus shown in FIG. 6, and implement the image processing method in the embodiments of this application. The computer program may be recorded in, for example, a computer-readable storage medium, and may be loaded into the foregoing computing device by using the computer-readable storage medium, and run in the computing device.

In this embodiment of this application, after a target shader code corresponding to the operation event is obtained in response to an operation event for a target game run in a target container, a compilation process of the target shader code may be skipped to directly obtain a target compilation result of the target shader code from a game image or a target shared directory between the target container and an associated container of the target container. Then, graphic processing may be performed according to the target compilation result, to obtain a feedback image corresponding to the operation event; and the feedback image is displayed on a target game client. It can be seen that, in this embodiment of this application, graphic processing is performed by directly using the target compilation result compiled from the game image or the associated container in the target shared directory, so that a duration of compiling the target shader code can be effectively shortened, thereby increasing the running speed of a target game.

Figure 7:
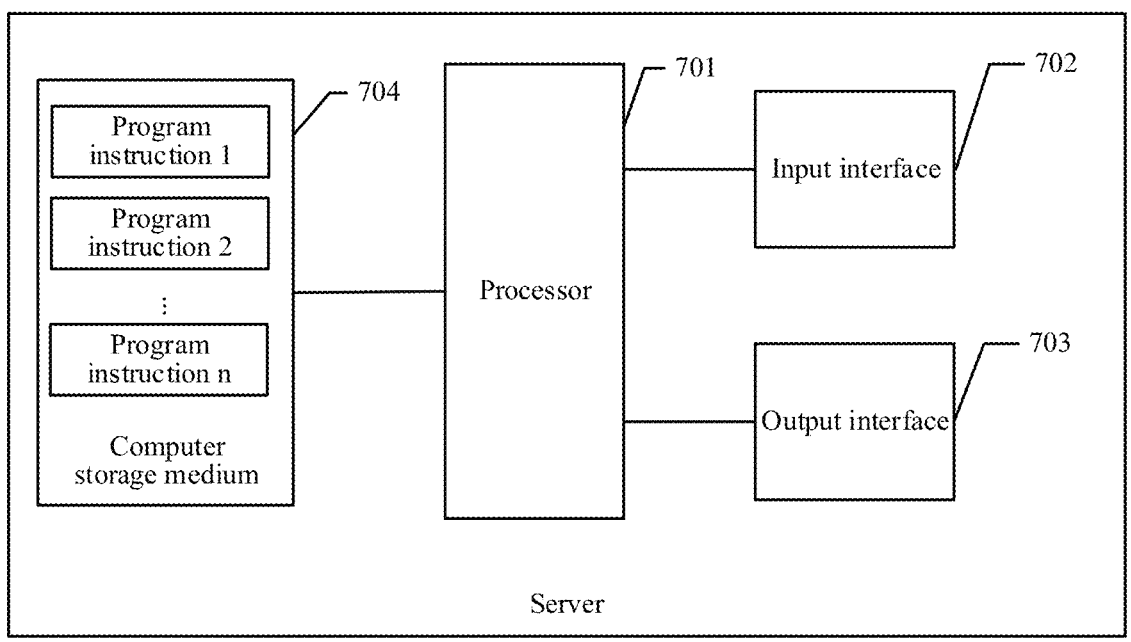
FIG. 7 is a schematic structural diagram of a server according to an embodiment of this application.

Based on the descriptions of the foregoing method embodiments and apparatus embodiments, an embodiment of this application further provides a server. The server may be the target edge server mentioned above. Referring to FIG. 7, the server includes at least a processor 701, an input interface 702, an output interface 703, and a computer storage medium 704. The processor 701, the input interface 702, the output interface 703, and the computer storage medium 704 in the server may be connected by using a bus or in another manner.

The computer storage medium 704 is a memory device in the server and is configured to store programs and data. It may be understood that, the computer storage medium 704 may include an internal storage medium of the server and may also include an expanded storage medium supported by the server. The computer storage medium 704 provides a storage space storing an operating system of the server. In addition, the storage space further stores one or more instructions adapted to be loaded and executed by the processor 701. The instructions may be one or more computer programs (including program code). The computer storage medium may be a high-speed RAM, or may be a non-volatile memory, for example, at least one magnetic disk memory. Alternatively, the computer storage medium may also be at least one computer storage medium far away from the foregoing processor. The processor 701 (or referred to as a CPU) is a computing core and a control core of the server, which is adapted to implement one or more instructions, and specifically, adapted to load and execute one or more instructions to implement corresponding method processes or corresponding functions.

In another embodiment, the processor 701 may load and execute one or more instructions stored in the computer storage medium 704, to implement corresponding steps of the embodiments of the image processing method shown in FIG. 2 or FIG. 4. In a specific implementation, the one or more instructions in the computer storage medium 704 are loaded by the processor 701 to further perform the following steps:

obtaining, in response to an operation event for a target game run in a target container, a target shader code corresponding to the operation event, where the operation event is detected in a game picture of the target game displayed on a target game client that is connected to the target container;

obtaining a target compilation result of the target shader code from a game resource, the game resource including at least one of the following: a game image of the target game and a target shared directory between the target container and an associated container of the target container, the target shared directory including a first compilation result obtained by compiling at least one shader code by the associated container in a process of running the game; and performing graphic processing according to the target compilation result, to obtain a feedback image corresponding to the operation event; and displaying the feedback image on the target game client.

In an implementation, the game resource includes the game image and the target shared directory; the game image includes a second compilation result of at least one shader code compiled by pre-running the target game, and each second compilation result is added to the game image in a process of producing the game image; and Correspondingly, in a process of obtaining a target compilation result of the target shader code from a game resource, the one or more instructions may be loaded by the processor 701 to specifically perform the following steps:

detecting whether a second compilation result of the target shader code exists in the game image of the target game;

obtaining the second compilation result of the target shader code from the game image as the target compilation result in accordance with a determination that the second compilation result exists; and obtaining the first compilation result from the target shared directory between the target container and the associated container of the target container as the target compilation result of the target shader code in accordance with a determination that the second compilation result does not exist.

In another implementation, the game image further includes an index value of at least one shader code, and each index value corresponds to one second compilation result. Correspondingly, in a process of detecting whether a second compilation result of the target shader code exists in the game image of the target game, the one or more instructions may be loaded by the processor 701 to specifically perform the following steps:

performing a hash operation on the target shader code, to obtain a target index value of the target shader code;

determining that the second compilation result of the target shader code exists in the game image in accordance with a determination that the target index value is included in the game image; and determining that the second compilation result of the target shader code does not exist in the game image in accordance with a determination that the target index value is not included in the game image.

In another implementation, the target game is a cloud game in a cloud gaming system, and the cloud gaming system includes at least one edge server and a plurality of game clients; at least one system container is deployed inside each edge server, and each system container is connected to at least one game client; and the each system container is configured to run one or more games, and in a process of running any game, the each system container transmits a game picture of the any game to the game client to which the system container is connected for display, where the target container is any system container running based on a server operating system of a target edge server, and the target edge server is any edge server in the cloud gaming system; and the associated container is a system container running an associated game of the target game, and the associated game includes: the target game or a game using a same game engine as the target game.

In another implementation, the one or more instructions may further be loaded by the processor 701 to perform the following steps:

receiving a directory mounting instruction transmitted by the target edge server, the directory mounting instruction carrying the target shared directory; and designating a dynamic cache directory in the target container, and mounting the target shared directory to the dynamic cache directory, to keep data between the target shared directory and the dynamic cache directory synchronized, where the target shared directory is also mounted to a preset directory of the associated container, to cache the first compilation result obtained by compiling at least one shader code by the associated container in a process of running the associated game.

In another implementation, the dynamic cache directory is designated by using a first environment variable, and the second compilation result is designated in a storage directory of the game image by using a second environment variable.

In another implementation, the target shared directory is located in a server host on which the server operating system resides. Alternatively, the target shared directory is located in a network file system, and the network file system is independent of each edge server in the cloud gaming system and allows assess by a system container of the each edge server.

In another implementation, when the target shared directory is located in the server host, the server host further includes other shared directories other than the target shared directory, and the other shared directories in the server host are used for mounting system containers in the target edge server that are not related to the target container.

When the target shared directory is located in the network file system, the network file system further includes other shared directories other than the target shared directory, and the other shared directories in the network file system are used for mounting system containers in the cloud gaming system that are not related to the target container.

In another implementation, the game resource does not include the target compilation result of the target shader code. Correspondingly, the one or more instructions may further be loaded by the processor 701 to perform the following steps:

in accordance with a determination that the target compilation result fails to be obtained from the game resource, compiling the target shader code to obtain the target compilation result; and caching the target compilation result to the dynamic cache directory, to synchronize the target compilation result to the target shared directory, the target compilation result is provided to the associated container from the target shared directory in response to a subsequent request for compiling the target shader code.

In this embodiment of this application, after a target shader code corresponding to the operation event is obtained in response to an operation event for a target game run in a target container, a compilation process of the target shader code may be skipped to directly obtain a target compilation result of the target shader code from a game image or a target shared directory between the target container and an associated container of the target container. Then, graphic processing may be performed according to the target compilation result, to obtain a feedback image corresponding to the operation event; and the feedback image is displayed on a target game client. It can be seen that, in this embodiment of this application, graphic processing is performed by directly using the target compilation result compiled from the game image or the associated container in the target shared directory, so that a duration of compiling the target shader code can be effectively shortened, thereby increasing the running speed of a target game.

According to an aspect of the embodiments of this application, a computer program product or a computer program is further provided, the computer program product or the computer program including computer instructions, the computer instructions being stored in a computer-readable storage medium. The processor of the computer device reads the computer instructions from the computer-readable storage medium, and the processor executes the computer instructions, to cause the computer device to perform the steps of the foregoing embodiments of the image processing method shown in FIG. 2 or FIG. 4.

It is to be understood that, the description disclosed above is merely exemplary embodiments of this application, and certainly is not intended to limit the scope of the claims of this application. Therefore, equivalent variations made according to the claims of this application shall fall within the scope of this application.

Note that the various embodiments described above can be combined with any other embodiments described herein. The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

As used herein, the term "unit" or "module" refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each unit or module can be implemented using one or more processors (or processors and memory). Likewise, a processor (or processors and memory) can be used to implement one or more modules or units. Moreover, each module or unit can be part of an overall module that includes the functionalities of the module or unit. The division of the foregoing functional modules is merely used as an example for description when the systems, devices, and apparatus provided in the foregoing embodiments performs an image processing method. In practical application, the foregoing functions may be allocated to and completed by different functional modules according to requirements, that is, an inner structure of a device is divided into different functional modules to implement all or a part of the functions described above.

What is claimed is:

1. An image processing method, comprising:
obtaining, in response to a trigger for an operation event of a target game running in a target container, a target shader code corresponding to the operation event;
obtaining a target compilation result of the target shader code from a game resource, the game resource comprising: a game image of the target game and/or a target shared directory between the target container and an associated container of the target container, the target shared directory comprising a first compilation result of compiling, when running the target game, at least one shader code by the associated container; and
performing graphic processing according to the target compilation result to obtain a feedback image corresponding to the operation event.

2. The method according to claim 1, wherein the game resource comprises the game image and the target shared directory; the game image comprises a second compilation result of at least one shader code compiled by pre-running the target game, and each second compilation result is added to the game image; and
obtaining a target compilation result of the target shader code from a game resource comprises:
detecting whether a second compilation result of the target shader code exists in the game image of the target game;
game image in accordance with a determination that the second compilation result exists:
obtaining the second compilation result of the target shader code from the game image as the target compilation result; and
in accordance with a determination that the second compilation result does not exist:
obtaining the first compilation result from the target shared directory as the target compilation result of the target shader code.

3. The method according to claim 2, wherein the game image further comprises an index value of at least one shader code, and each index value corresponds to one second compilation result; and detecting whether the second compilation result of the target shader code exists in the game image of the target game comprises:
performing a hash operation on the target shader code to obtain a target index value of the target shader code;
determining that the second compilation result of the target shader code exists in the game image in accordance with a determination that the game image comprises the target index value; and
determining that the second compilation result of the target shader code does not exist in the game image in accordance with a determination that the game image does not include the target index value.

4. The method according to claim 1, wherein the target game is a cloud game in a cloud gaming system, and the cloud gaming system comprises at least one edge server and a plurality of game clients; at least one system container is deployed inside each edge server, and each system container is connected to at least one game client and is configured to run one or more games,
wherein each system container is configured to transmit a game picture of a game to the game client to which the system container is connected for display, wherein
the target container is a system container associated with a server operating system of a target edge server, and the target edge server is an edge server in the cloud gaming system;
and the associated container is a system container running the target game or a game using a same game engine as the target game.

5. The method according to claim 4, further comprising:
receiving a directory mounting instruction transmitted by the target edge server, wherein the directory mounting instruction includes the target shared directory; and
designating a dynamic cache directory in the target container, and mounting the target shared directory to the dynamic cache directory to synchronize data between the target shared directory and the dynamic cache directory, wherein
the target shared directory is mounted to a preset directory of the associated container to cache the first compilation result of compiling, when running the target game or the game using the same game engine as the target game, at least one shader code by the associated container.

6. The method according to claim 5, wherein the dynamic cache directory is designated by a first variable, and the second compilation result is designated in a storage directory of the game image by a second variable.

7. The method according to claim 4, wherein the target shared directory is located in a server host on which the server operating system resides.

8. The method according to claim 4, wherein the target shared directory is located in a network file system, and the network file system is independent of each edge server in the cloud gaming system, and the network file system is accessible to a system container of each edge server.

9. The method according to claim 7, wherein the server host further comprises other shared directories distinct from the target shared directory, and the other shared directories in the server host are used for mounting system containers in the target edge server that are not related to the target container.

10. The method according to claim 8, wherein the network file system further comprises shared directories distinct from the target shared directory, and the other shared directories in the network file system are used for mounting system containers in the cloud gaming system that are not related to the target container.

11. The method according to claim 5, further comprising:
in accordance with a determination that the game resource does not include the target compilation of the target shader code:
compiling the target shader code to obtain the target compilation result; and
caching the target compilation result to the dynamic cache directory to synchronize the target compilation result to the target shared directory, wherein the target compilation result is provided to the associated container from the target shared directory in response to a subsequent request for compiling the target shader code.

12. The method according to claim 1, further comprising:
after obtaining the feedback image corresponding to the operation event, wherein the trigger for the operation event is detected in a game picture of the target game displayed on a target game client that is connected to the target container:

displaying the feedback image on the target game client.

13. An electronic device, comprising:
one or more processors; and
memory storing one or more programs, the one or more programs comprising instructions that, when executed by the one or more processors, cause the one or more processors to perform operations comprising:
obtaining, in response to a trigger for an operation event of a target game running in a target container, a target shader code corresponding to the operation event;
obtaining a target compilation result of the target shader code from a game resource, the game resource comprising: a game image of the target game and a target shared directory between the target container and an associated container of the target container, the target shared directory comprising a first compilation result of compiling, when running the target game, at least one shader code by the associated container; and
performing graphic processing according to the target compilation result to obtain a feedback image corresponding to the operation event.

14. The electronic device according to claim 13, wherein the game resource comprises the game image and the target shared directory; the game image comprises a second compilation result of at least one shader code compiled by pre-running the target game, and each second compilation result is added to the game image; and
obtaining a target compilation result of the target shader code from a game resource comprises:
detecting whether a second compilation result of the target shader code exists in the game image of the target game;
game image in accordance with a determination that the second compilation result exists:
obtaining the second compilation result of the target shader code from the game image as the target compilation result; and
in accordance with a determination that the second compilation result does not exist:
obtaining the first compilation result from the target shared directory as the target compilation result of the target shader code.

15. The electronic device according to claim 14, wherein the game image further comprises an index value of at least one shader code, and each index value corresponds to one second compilation result; and detecting whether the second compilation result of the target shader code exists in the game image of the target game comprises:
performing a hash operation on the target shader code to obtain a target index value of the target shader code;
determining that the second compilation result of the target shader code exists in the game image in accordance with a determination that the game image comprises the target index value; and
determining that the second compilation result of the target shader code does not exist in the game image in accordance with a determination that the game image does not include the target index value.

16. The electronic device according to claim 13, wherein the target game is a cloud game in a cloud gaming system, and the cloud gaming system comprises at least one edge server and a plurality of game clients; at least one system container is deployed inside each edge server, and each system container is connected to at least one game client and is configured to run one or more games,
wherein each system container is configured to transmit a game picture of a game to the game client to which the system container is connected for display, wherein
the target container is a system container associated with a server operating system of a target edge server, and the target edge server is an edge server in the cloud gaming system; and the associated container is a system container running the target game or a game using a same game engine as the target game.

17. The electronic device according to claim 16, further comprising:
receiving a directory mounting instruction transmitted by the target edge server, wherein the directory mounting instruction includes the target shared directory; and
designating a dynamic cache directory in the target container, and mounting the target shared directory to the dynamic cache directory to synchronize data between the target shared directory and the dynamic cache directory, wherein
the target shared directory is mounted to a preset directory of the associated container to cache the first compilation result of compiling, when running the target game or the game using the same game engine as the target game, at least one shader code by the associated container.

18. A non-transitory computer-readable storage medium, storing a computer program, the computer program, when executed by one or more processors of an electronic device, cause the one or more processors to perform operations comprising:
obtaining, in response to a trigger for an operation event of a target game running in a target container, a target shader code corresponding to the operation event;
obtaining a target compilation result of the target shader code from a game resource, the game resource comprising: a game image of the target game and a target shared directory between the target container and an associated container of the target container, the target shared directory comprising a first compilation result of compiling, when running the target game, at least one shader code by the associated container; and
performing graphic processing according to the target compilation result to obtain a feedback image corresponding to the operation event.

19. The non-transitory computer-readable storage medium according to claim 18, wherein the game resource comprises the game image and the target shared directory; the game image comprises a second compilation result of at least one shader code compiled by pre-running the target game, and each second compilation result is added to the game image; and
obtaining a target compilation result of the target shader code from a game resource comprises:
detecting whether a second compilation result of the target shader code exists in the game image of the target game;
game image in accordance with a determination that the second compilation result exists:
obtaining the second compilation result of the target shader code from the game image as the target compilation result; and
in accordance with a determination that the second compilation result does not exist:

obtaining the first compilation result from the target shared directory as the target compilation result of the target shader code.

20. The non-transitory computer-readable storage medium according to claim 19, wherein the game image further comprises an index value of at least one shader code, and each index value corresponds to one second compilation result; and detecting whether the second compilation result of the target shader code exists in the game image of the target game comprises:
   performing a hash operation on the target shader code to obtain a target index value of the target shader code;
   determining that the second compilation result of the target shader code exists in the game image in accordance with a determination that the game image comprises the target index value; and
   determining that the second compilation result of the target shader code does not exist in the game image in accordance with a determination that the game image does not include the target index value.

* * * * *